(12) United States Patent
Tsuzuki

(10) Patent No.: US 10,979,168 B2
(45) Date of Patent: Apr. 13, 2021

(54) TRANSMISSION DEVICE, TRANSMISSION SYSTEM, AND TRANSMISSION METHOD

(71) Applicant: FUJITSU LIMITED, Kawasaki (JP)

(72) Inventor: Tatsuya Tsuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/541,480

(22) Filed: Aug. 15, 2019

(65) Prior Publication Data
US 2020/0067624 A1 Feb. 27, 2020

(30) Foreign Application Priority Data

Aug. 23, 2018 (JP) .............................. JP2018-156676

(51) Int. Cl.
*H04J 14/02* (2006.01)
*H04Q 11/00* (2006.01)

(52) U.S. Cl.
CPC ...... *H04J 14/0241* (2013.01); *H04J 14/0212* (2013.01); *H04J 14/0221* (2013.01); *H04Q 11/0066* (2013.01); *H04Q 2011/0086* (2013.01)

(58) Field of Classification Search
CPC ............. H04J 14/0241; H04J 14/0212; H04J 14/0221; H04Q 11/0066; H04Q 2011/0086
USPC ......................................................... 398/48
See application file for complete search history.

(56) References Cited

U.S. PATENT DOCUMENTS

| | | | | |
|---|---|---|---|---|
| 8,625,995 B2* | 1/2014 | Zsigmond | ........... | H04J 14/0221 398/57 |
| 2003/0099475 A1* | 5/2003 | Nemoto | ............. | H04J 14/0245 398/83 |
| 2009/0116834 A1* | 5/2009 | Sugawa | ............... | H04J 14/0204 398/6 |
| 2009/0162067 A1* | 6/2009 | Kobayashi | .......... | H04J 14/0212 398/79 |
| 2010/0158532 A1* | 6/2010 | Goto | .................. | H04B 10/2941 398/81 |
| 2012/0224851 A1 | 9/2012 | Takara et al. | | |
| 2012/0251120 A1* | 10/2012 | McNicol | ............ | H04B 10/5161 398/91 |
| 2016/0344481 A1* | 11/2016 | Vassilieva | ............ | H04B 10/564 |
| 2018/0006755 A1* | 1/2018 | Matsuyama | ............ | H04J 14/02 |

FOREIGN PATENT DOCUMENTS

WO 2011/030897 3/2011

OTHER PUBLICATIONS

Masahiko Jinno et al., "Distance-Adaptive Spectrum Resource Allocation in Spectrum-Sliced Elastic Optical Path Network", Topics in Optical Communications, IEEE Communications Magazine, pp. 138-145, Aug. 2010 (8 pages).

* cited by examiner

*Primary Examiner* — Dalzid E Singh
(74) *Attorney, Agent, or Firm* — Fujitsu Patent Center

(57) ABSTRACT

A transmission device includes a wavelength multiplexer that wavelength-multiplexes a plurality of optical signals having different wavelengths to generate a wavelength-multiplexed optical signal, an amplifier that outputs the wavelength-multiplexed optical signal to a transmission path, and a first processor that allocates wavelength bands to the plurality of optical signals to be wavelength-multiplexed into the wavelength-multiplexed optical signal and controls power of the wavelength-multiplexed optical signal in accordance with the wavelength bands allocated to the plurality of optical signals.

20 Claims, 18 Drawing Sheets

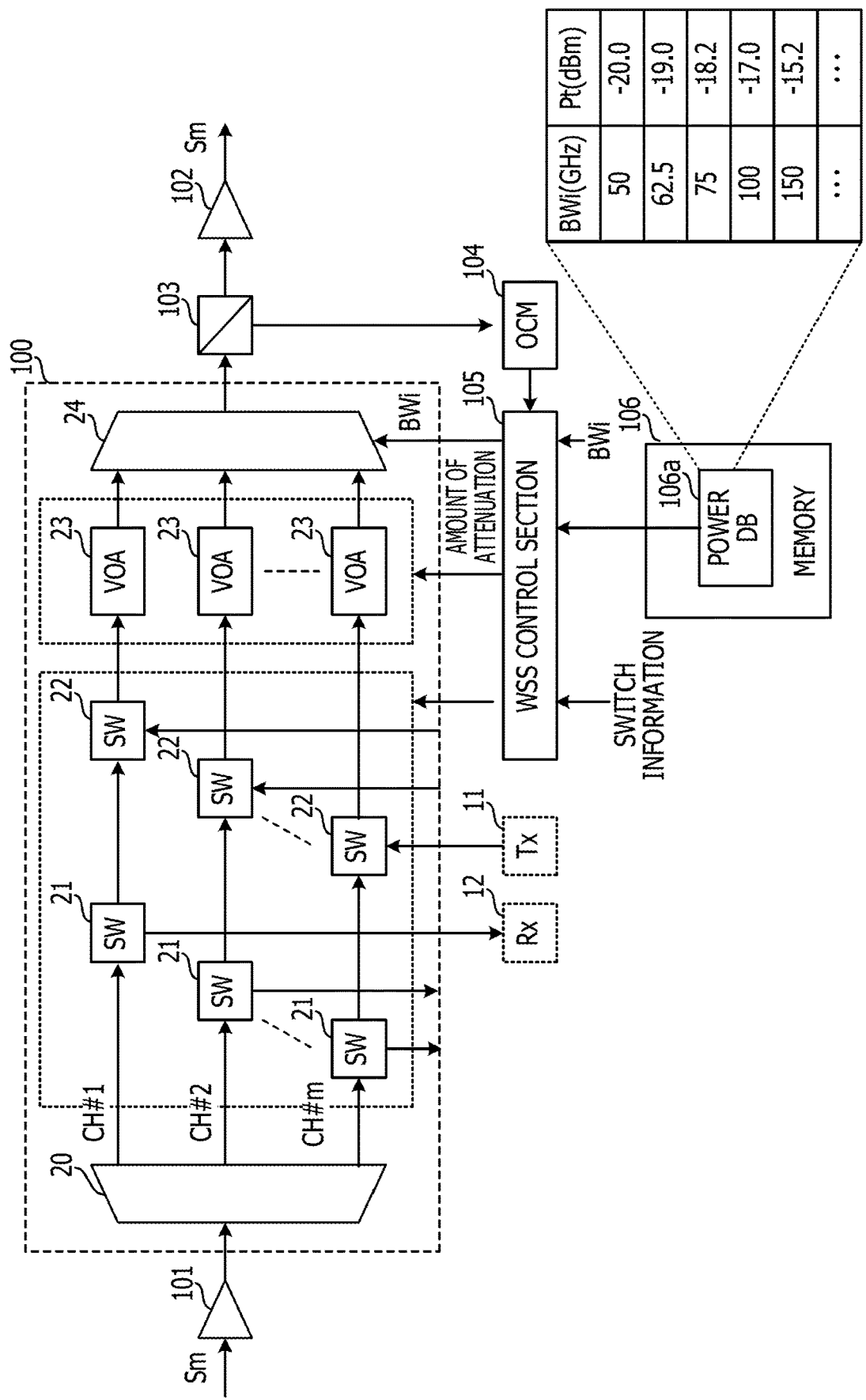

FIG. 5
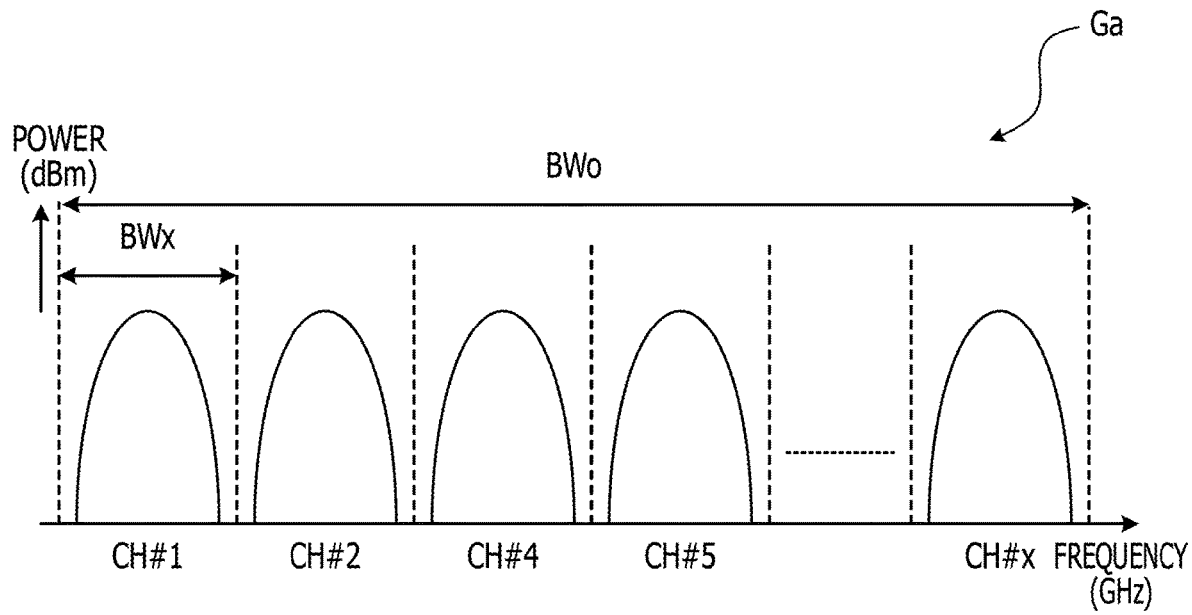
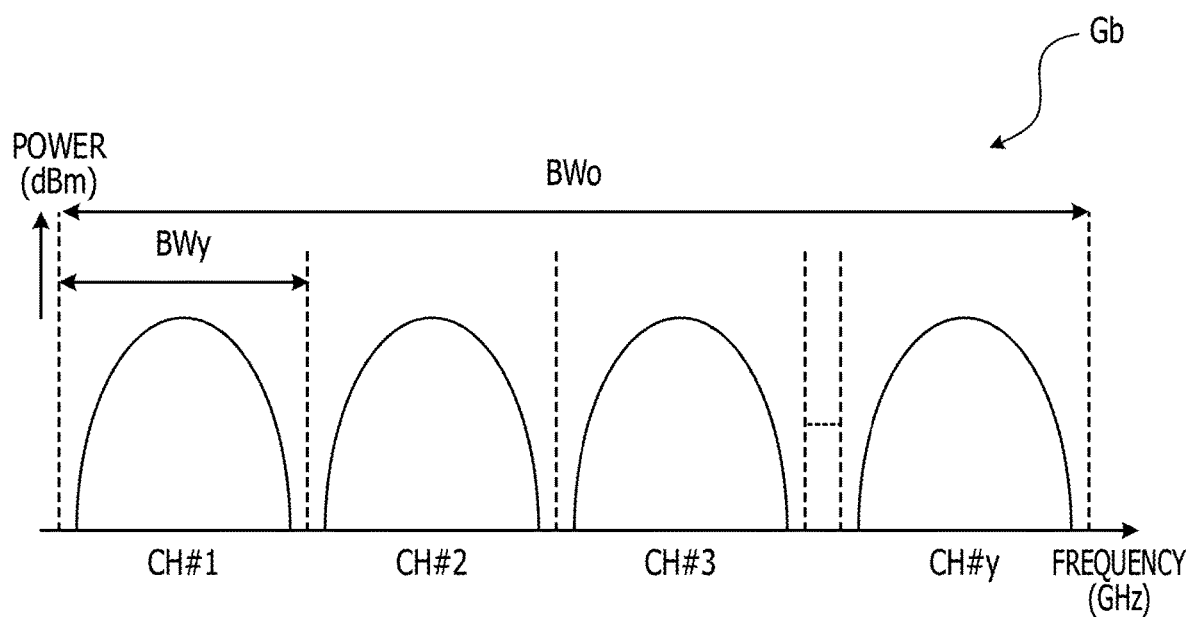

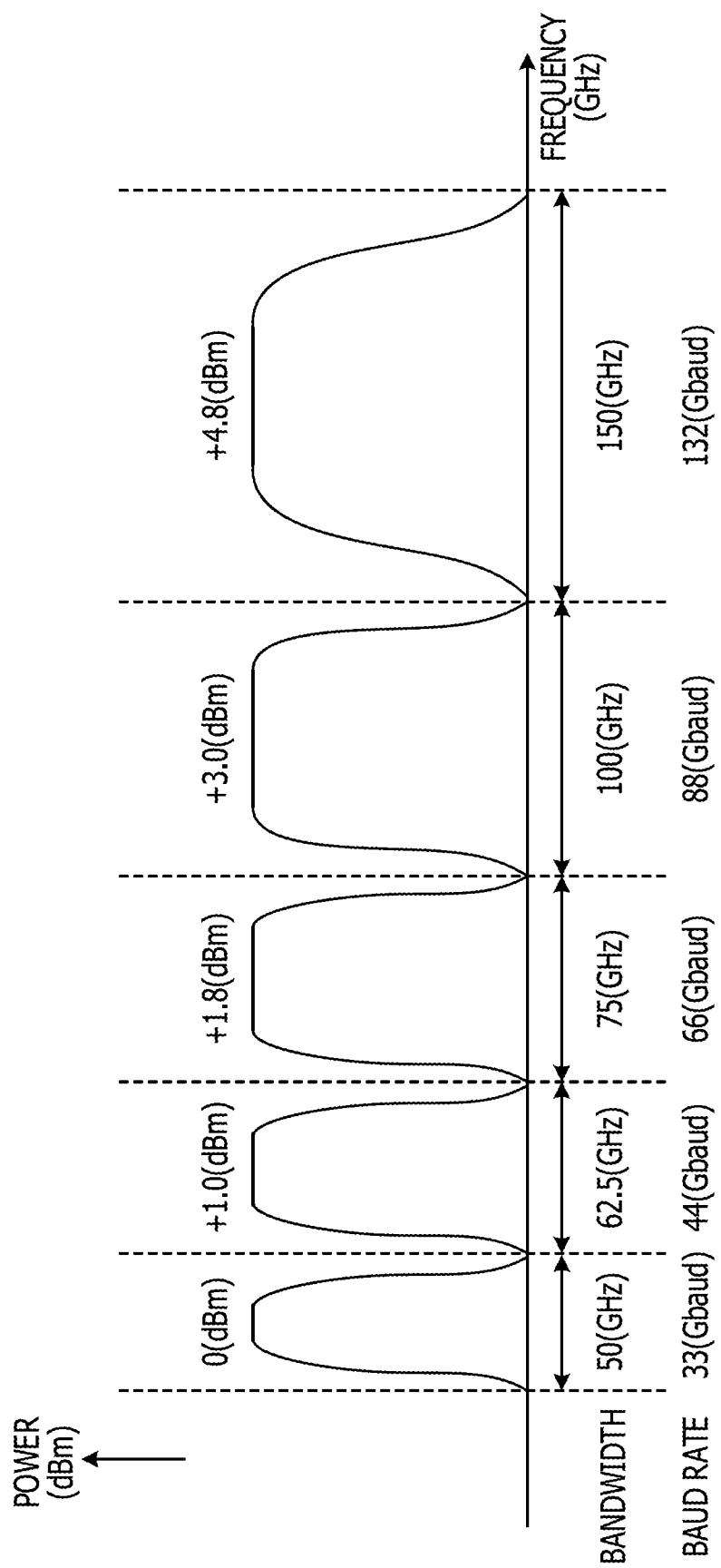

FIG. 15
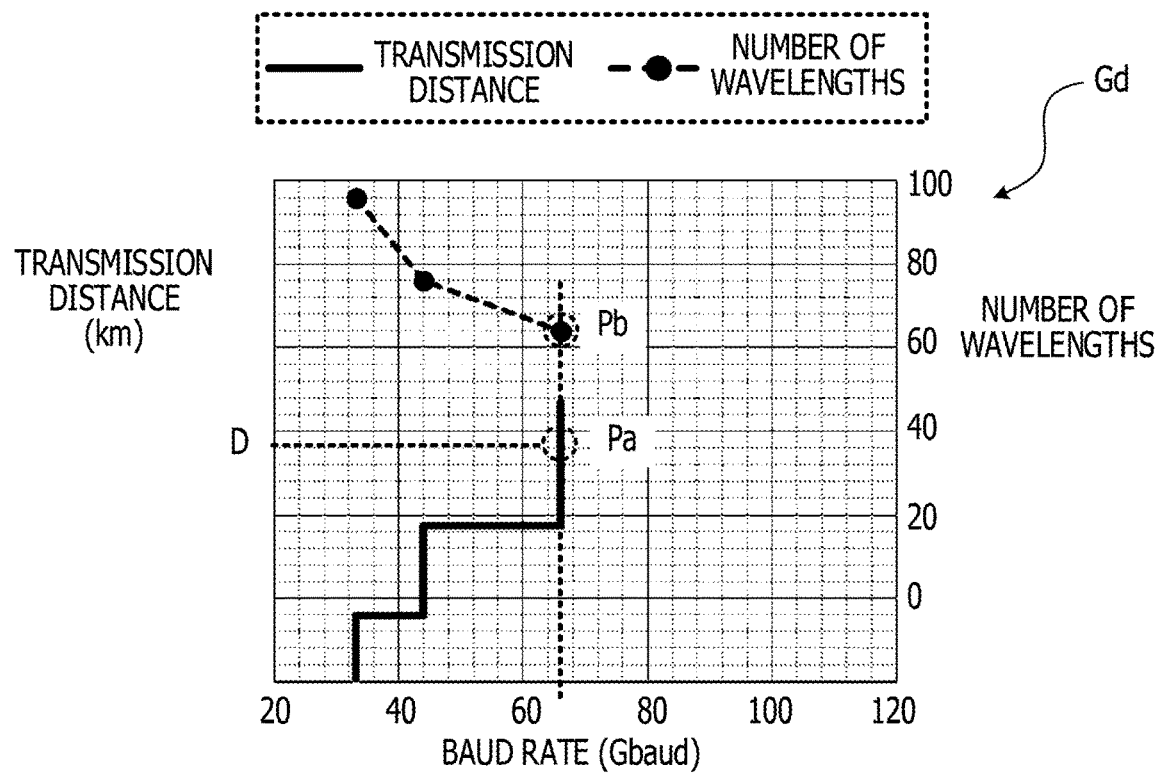
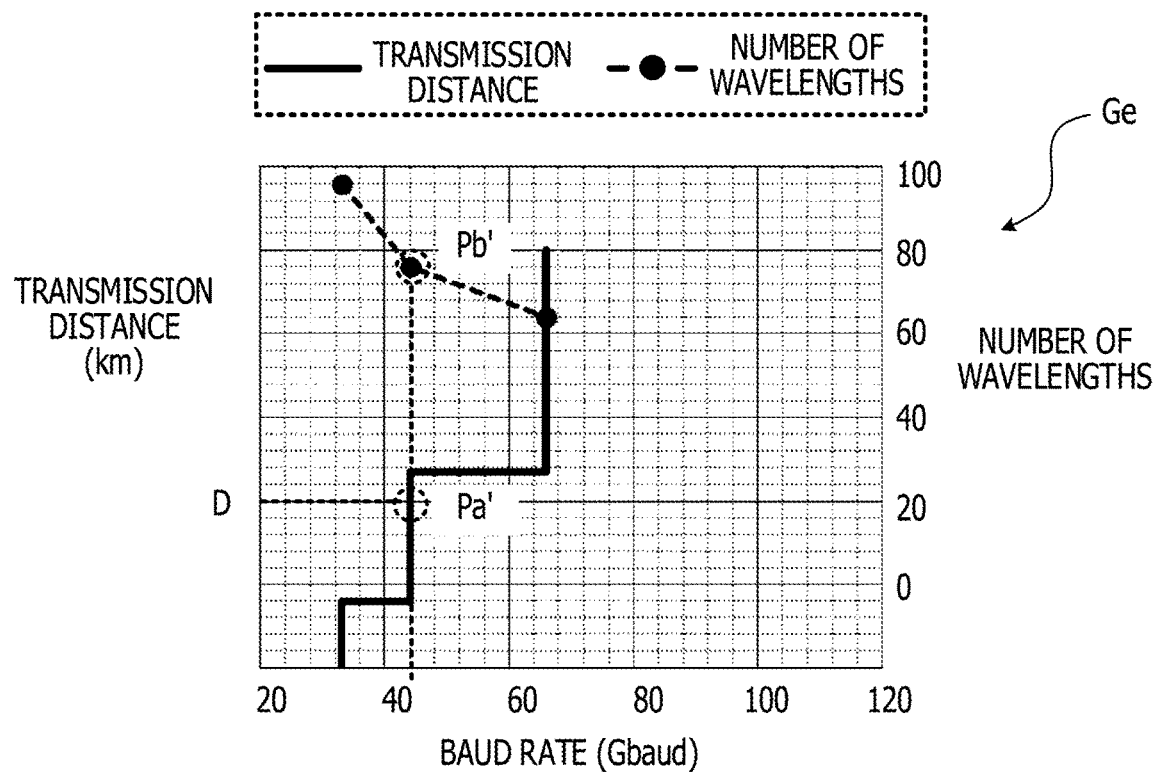

FIG. 16
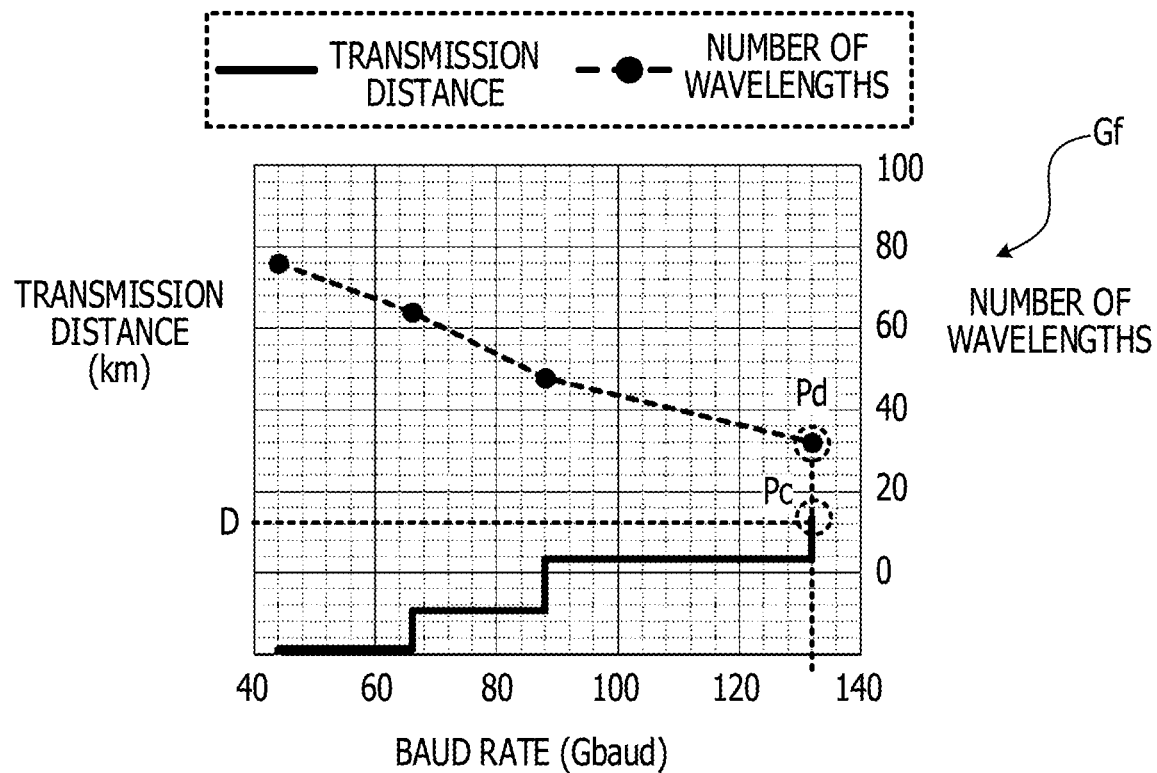
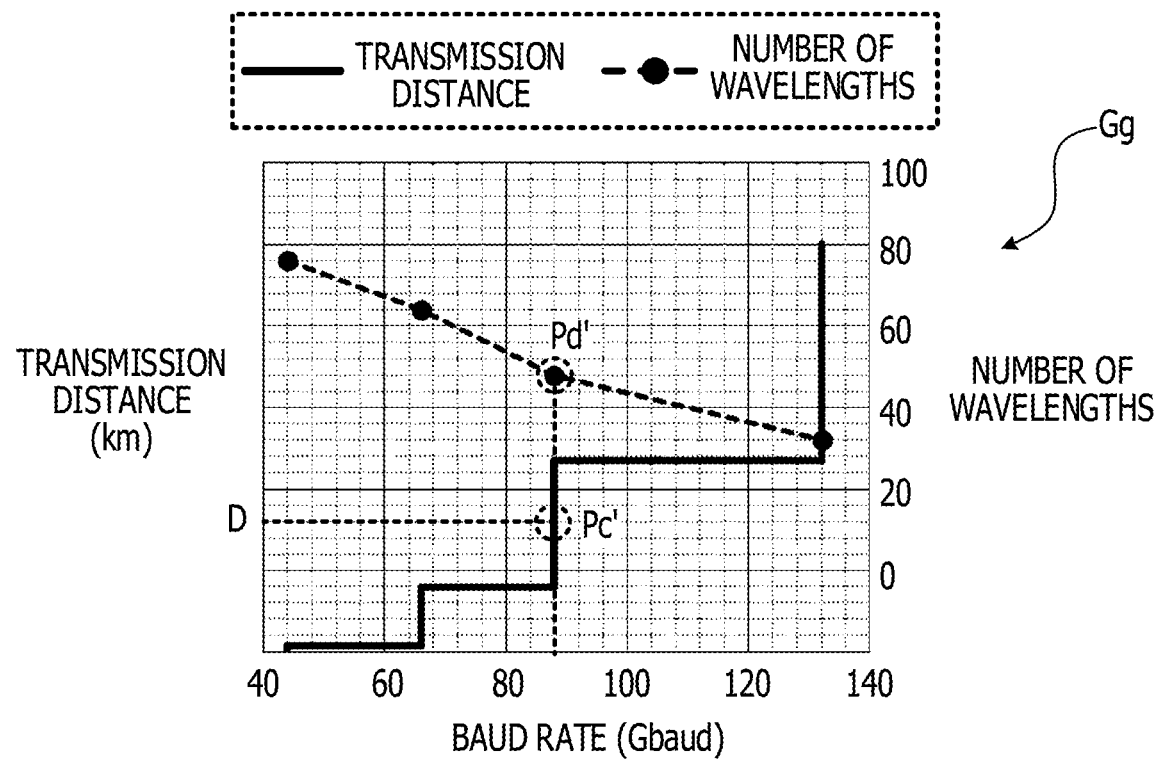

TRANSMISSION DEVICE, TRANSMISSION SYSTEM, AND TRANSMISSION METHOD

CROSS-REFERENCE TO RELATED APPLICATION

This application is based upon and claims the benefit of priority of the prior Japanese Patent Application No. 2018-156676, filed on Aug. 23, 2018, the entire contents of which are incorporated herein by reference.

FIELD

The embodiments discussed herein are related to a transmission device, a transmission system, and a transmission method.

BACKGROUND

Nodes on a route with a long transmission distance in a network are equipped with 3R regenerators which have re-amplification, reshaping and retiming (3R) functions. The 3R regenerator once converts an optical signal to an electrical signal and then converts the electrical signal back to the optical signal, thus generating the optical signal, which allows the transmission distance to be extended.

On the other hand, it has been studied to achieve long-distance transmission of large-volume data, using not 3R regenerators but a transmitter and a receiver that are capable of selecting the modulation scheme and the baud rate of signals. International Publication Pamphlet No. WO 2011/030897 discusses selecting a combination of a modulation level of a multi-level modulation of a modulation format and a symbol rate for transmitting an optical path.

Related techniques are disclosed in, for example, International Publication Pamphlet No. WO 2011/030897 and the like.

For example, if a modulation scheme with a high modulation level, such as 16 Quadrature Amplitude Modulation (QAM), is selected, the transmission capacity increases but the optical signal-to-noise ratio (OSNR) tolerance decreases, which in turn shortens the transmission distance. For this reason, it is conceivable to increase the baud rate to achieve a desired transmission capacity.

However, in the case where the baud rate is increased, there is a possibility that the reception performance of the receiver fails to keep up with the increase in baud rate, lowering the OSNR tolerance, though less influential than the case of increasing the modulation level.

In view of these, it is desirable to provide a transmission device, a transmission system, and a transmission method that are capable of improving the OSNR tolerance.

SUMMARY

According to an aspect of the embodiments, a transmission device includes a wavelength multiplexer that wavelength-multiplexes a plurality of optical signals having different wavelengths to generate a wavelength-multiplexed optical signal, an amplifier that outputs the wavelength-multiplexed optical signal to a transmission path, and a first processor that allocates wavelength bands to the plurality of optical signals to be wavelength-multiplexed into the wavelength-multiplexed optical signal and controls power of the wavelength-multiplexed optical signal in accordance with the wavelength bands allocated to the plurality of optical signals.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is a configuration diagram illustrating an example of a transmission unit;

FIG. 5 is a diagram illustrating an example of an optical spectrum of a wavelength-multiplexed optical signal for each of bandwidths of optical signals;

FIG. 6 is a diagram illustrating an example of an optical spectrum the power of which changes in accordance with a bandwidth;

FIG. 15 is a diagram illustrating an example of changes in transmission distance and number of wavelengths relative to a baud rate of an optical signal in the case where the transmission rate is fixed to 200 (Gbps); and FIG. 16 is a diagram illustrating an example of changes in transmission distance and number of wavelengths relative to a baud rate of an optical signal in the case where the transmission rate is fixed to 400 (Gbps).

DESCRIPTION OF EMBODIMENTS

Figure 1:
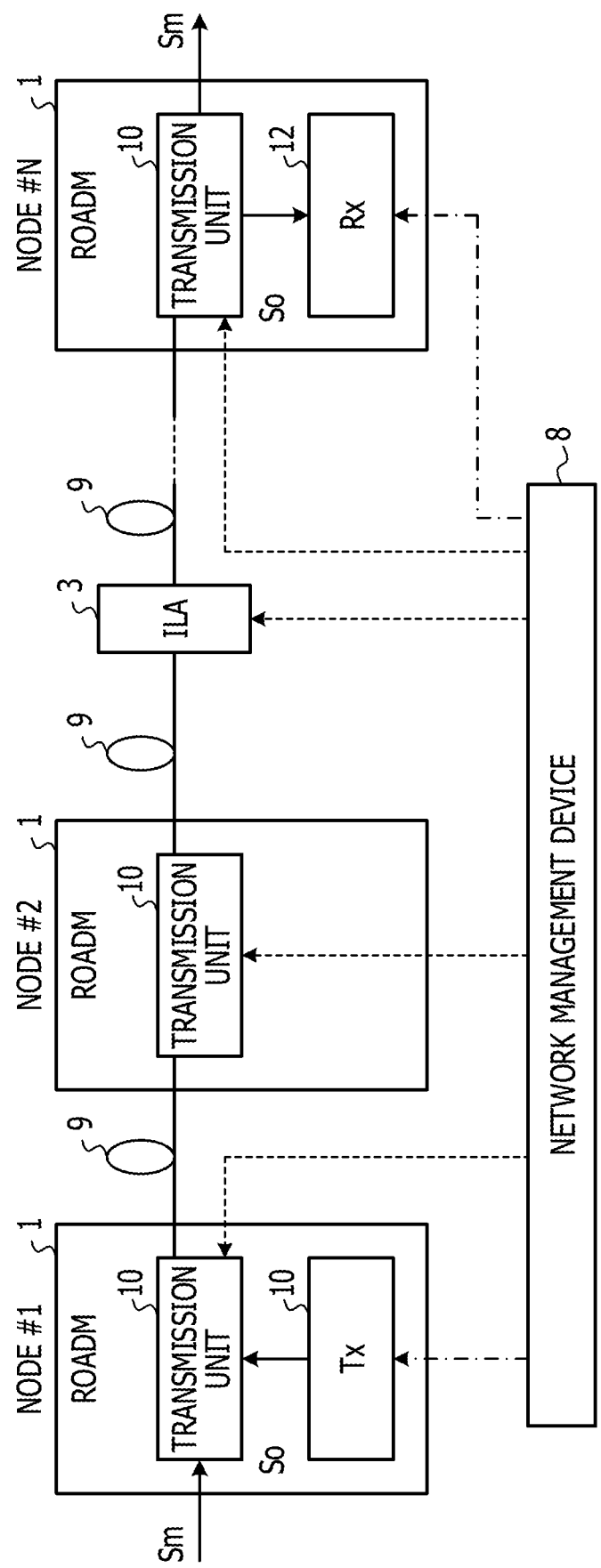
FIG. 1 is a configuration diagram illustrating an example of a transmission system.

FIG. 1 is a configuration diagram illustrating an example of a transmission system. The transmission system includes a plurality of nodes #1 to #N (N is a positive integer). Although in this example, the nodes #1 to #N are connected in series via transmission paths 9 such as optical fibers, the configuration is not limited to this and the nodes #1 to #N may be connected in a mesh fashion.

Each of the nodes #1 to #N is equipped with a ROADM 1, which is an example of a transmission device. The ROADM 1 transmits a wavelength-multiplexed optical signal Sm in which a plurality of optical signals having different wavelengths are wavelength-multiplexed. Among the nodes #1 to #N, an inline-amplifier (ILA) 3 which amplifies the wavelength-multiplexed optical signal Sm may be disposed.

The ROADM 1 includes a transmission unit 10, a transmitter (Tx) 11, and a receiver (Rx) 12. In the case where an optical signal So is transmitted from the node #1 to the node #N, the transmitter 11 at the start node #1 transmits the optical signal So to the transmission unit 10, and the transmission unit 10 wavelength-multiplexes the optical signal So into the wavelength-multiplexed optical signal Sm and outputs the resultant signal to the transmission path 9. The wavelength-multiplexed optical signal Sm is inputted to the relay node #2.

At the relay node #2, the transmission unit 10 wavelength-multiplexes the optical signal So contained in the wavelength-multiplexed optical signal Sm from the node #1 into the wavelength-multiplexed optical signal Sm again and outputs the resultant signal to the transmission path 9. The wavelength-multiplexed optical signal Sm is amplified while passing through the inline-amplifier 3 and is inputted to the end node #N. At the end node #N, the transmission unit 10 demultiplexes the optical signal So from the wavelength-multiplexed optical signal Sm and outputs the optical signal So to the receiver 12, and the receiver 12 receives the optical signal So.

In this way, the ROADM 1 at the start node #1 adds the optical signal So, the ROADM 1 at the relay node #2 passes the optical signal So through, and the ROADM 1 at the end node #N drops the optical signal So.

A network management device 8 is an example of a management device and manages the ROADMs 1 of the nodes #1 to #N by communicating with the ROADMs 1 through a local area network (LAN) or the like. The network management device 8 may be a network element (NE)—operation system (OpS), for example.

The network management device 8 sets the bandwidth of the optical signal So and switch information in the transmission unit 10 as indicated by the dotted arrow. The transmission unit 10 sets the bandwidth in a wavelength filter of a wavelength selective switch (WSS) which wavelength-multiplexes the optical signal So, and sets the wavelength selective switch so as to add, drop, or pass through the optical signal So depending on the switch information.

The network management device 8 sets the modulation scheme and the baud rate of the optical signal So in the transmitter 11 and the receiver 12 as indicated by the dashed-dotted arrow. The transmitter 11 and the receiver 12 transmit and receive the optical signal So in accordance with the modulation scheme and the baud rate.

Figure 2:
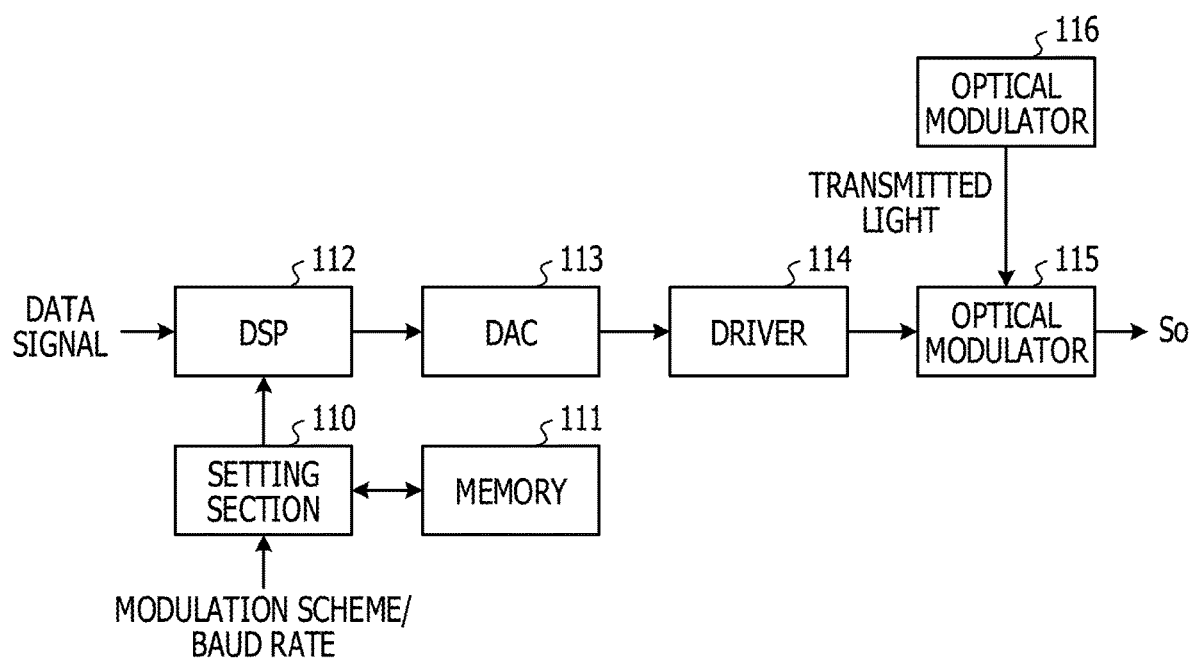
FIG. 2 is a configuration diagram illustrating an example of a transmitter.

FIG. 2 is a configuration diagram illustrating an example of the transmitter 11. The transmitter 11 includes a setting section 110, a memory 111, a digital signal processor (DSP) 112, a digital-to-analog converter (DAC) 113, a driver 114, an optical modulator 115, and a laser diode (LD) 116.

The DSP 112 processes data signal inputted from a client network. The data signal may be, but is not limited to, an Ethernet (Registered Trademark, the same applies below) signal, for example.

The setting section 110 is, for example, a processor such as a central processing unit (CPU), and receives information on the modulation scheme and the baud rate of the optical signal So from the network management device 8 and stores the information in the memory 111. The setting section 110 sets the modulation scheme and the baud rate in the DSP 112.

The DSP 112 modulates the data signal in accordance with the set modulation scheme. The modulation scheme may be, for example, any of multi-level modulation schemes having different modulation levels such as Quadrature Phase Shift Keying (QPSK), 8QAM, 16QAM, 64QAM, and 256QAM. The DSP 112 generates an electric field signal by mapping the data signal to a symbol according to the modulation scheme and outputs the electric field signal to the DAC 113 at the set baud rate.

The DAC 113 converts the electric field signal from the digital signal to the analog signal and outputs the resultant signal to the driver 114. The driver 114 is, for example, an amplifier, and adjust the voltage of the electric field signal to an appropriate level and outputs the electric field signal to the optical modulator 115.

The optical modulator 115 is, for example, a Mach-Zehnder modulator and optically modulates transmitted light inputted from the laser diode 116 based on the electric field signal. In this way, the optical modulator 115 generates the optical signal So and outputs the optical signal So to the transmission unit 10.

Figure 3:
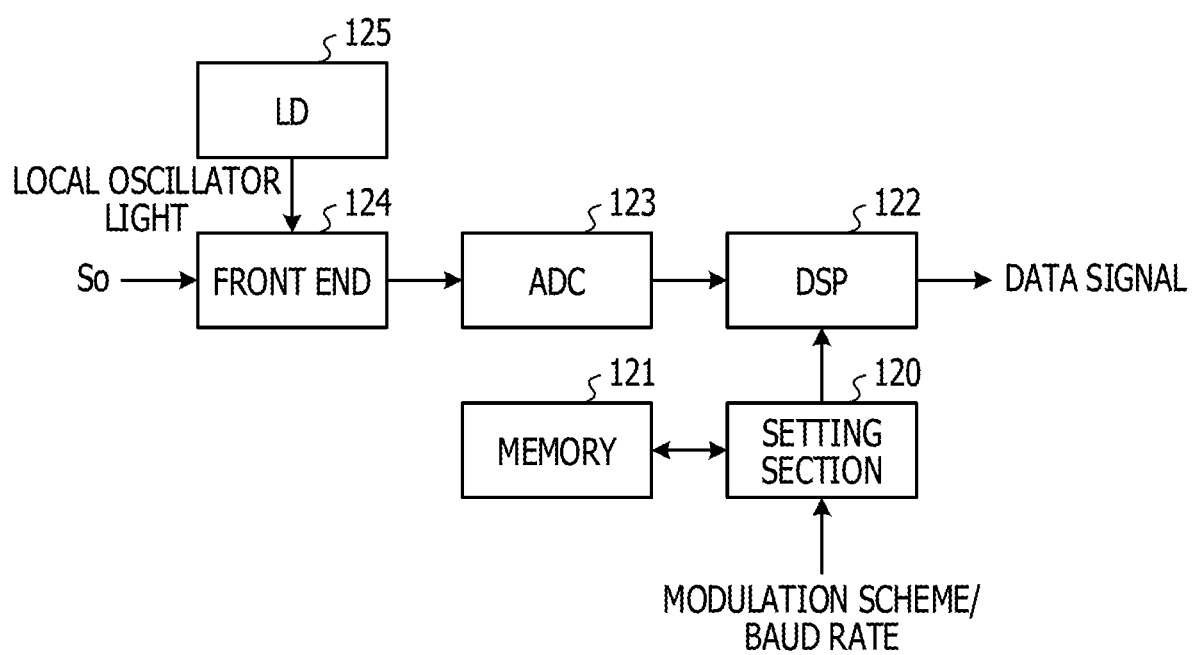
FIG. 3 is a configuration diagram illustrating an example of a receiver.

FIG. 3 is a configuration diagram illustrating an example of the receiver 12. The receiver 12 includes a setting section 120, a memory 121, a DSP 122, an analog-to-digital converter (ADC) 123, a front-end section 124, and a laser diode 125.

The optical signal So is inputted from the transmission unit 10 to the front-end section 124. The front-end section 124 includes a 90-degree optical hybrid, a photo detector (PD), and the like and generates an electric field signal from the optical signal So based on a local oscillator light inputted from the laser diode 125. The front-end section 124 outputs the electric field signal to the ADC 123. The ADC 123 converts the electric field signal from the analog signal to the digital signal and outputs the resultant signal to the DSP 122.

The setting section 120 is, for example, a processor such as a CPU, and receives information on the modulation scheme and the baud rate of the optical signal So from the network management device 8 and stores the information in the memory 121. The setting section 120 sets the modulation scheme and the baud rate in the DSP 122.

The DSP 122 receives the electric field signal at the set baud rate and modulates the electric field signal in accordance with the set modulation scheme. In this way, the DSP 122 regenerates the data signal and outputs the data signal to the client network.

FIG. 4A is a configuration diagram illustrating an example of the transmission unit 10. The transmission unit 10 includes a WSS section 100, a pre-amplifier 101, a post-amplifier 102, a splitter 103, an optical channel monitor (OCM) 104, a WSS control section 105, and a memory 106.

The pre-amplifier 101 amplifies the wavelength-multiplexed optical signal Sm at the stage before the WSS section 100. The wavelength-multiplexed optical signal Sm is inputted from the pre-amplifier 101 to the WSS section 100.

The WSS section 100 includes: a wavelength demultiplexer 20; a branch switch (SW) 21, an insertion switch (SW) 22, and a variable optical attenuator (VOA) 23 for each of channels CH #1 to CH #m (m is a positive integer) in the wavelength-multiplexed optical signal Sm; and a wavelength multiplexer 24.

The wavelength demultiplexer 20 is, for example, an arrayed waveguide and demultiplexes the wavelength-multiplexed optical signal Sm into optical signals of the respective channels CH #1 to CH #m. The optical signals of the respective channels CH #1 to CH #m have different wavelengths. The optical signals of the respective channels CH #1 to CH #m are inputted to the branch switches 21, respectively.

Each branch switch 21 is an optical switch and selects the output destination of an optical signal from the insertion switch 22 and the receiver 12 in accordance with the setting from the WSS control section 105. The branch switch 21 outputs an optical signal to be dropped to the receiver 12 and outputs an optical signal to be passed through to the insertion switch 22.

Each insertion switch 22 is an optical switch and selects the input source of an optical signal from the transmitter 11 and the branch switch 21 in accordance with the setting from the WSS control section 105. In the case where an optical signal to be passed through is inputted from the branch switch 21 at the former stage, or in the case where an optical signal to be added is inputted from the transmitter 11, the insertion switch 22 outputs an optical signal to the VOA 23.

The WSS control section 105 includes a processor such as a CPU, for example. The WSS control section 105 controls the branch switch 21 and the insertion switch 22 based on the switch information acquired from the network management device 8. The switch information indicates the output destination of the branch switch 21 and the input source of the insertion switch 22 according to whether an optical signal is to be added, dropped, or passed through for each of the channels CH #1 to CH #m.

The VOA 23 is an example of an attenuator and attenuates a corresponding one of optical signals of the respective channels CH #1 to CH #m, which are to be wavelength-multiplexed into the wavelength-multiplexed optical signal Sm. Each VOA 23 attenuates an optical signal based on an amount of attenuation set by the WSS control section 105, for example. In this way, the VOA 23 controls the power of the wavelength-multiplexed optical signal Sm to be outputted from the post-amplifier 102 to the transmission path 9. The attenuated optical signal is inputted to the wavelength multiplexer 24.

The wavelength multiplexer 24 wavelength-multiplexes an optical signal from each VOA 23 by means of an arrayed waveguide, for example. In this way, the wavelength-multiplexed optical signal Sm is generated. The WSS section 100 is an example of a generating section that generates the wavelength-multiplexed optical signal Sm.

The wavelength-multiplexed optical signal Sm is inputted from the wavelength multiplexer 24 to the splitter 103, and is separated and inputted from the splitter 103 to the OCM 104 and the post-amplifier 102. The splitter 103 may be, for example, an optical splitter. The OCM 104 detects the power of the optical signal for each of the channels CH #1 to CH #m and notifies the WSS control section 105 of the detected power. The WSS control section 105 controls the amount of attenuation of each VOA 23 such that the power of the optical signal approximates a target value.

The post-amplifier 102 is an example of an output section, and amplifies the wavelength-multiplexed optical signal Sm and outputs the wavelength-multiplexed optical signal Sm to the transmission path 9. The upper limit for the power of the wavelength-multiplexed optical signal Sm to be outputted from the post-amplifier 102 depends on the number of signals to be multiplexed into the wavelength-multiplexed optical signal Sm.

The wavelength multiplexer 24 also has a function of a wavelength filter for optical signals of the respective channels CH #1 to CH #m.

The wavelength multiplexer 24 includes a liquid crystal on silicon (LCOS), for example, and is thus capable of changing the passband of an optical signal. The LCOS has an electrode layer, a liquid crystal layer, and the like formed on a silicon substrate, in which a refractive index distribution is formed according to an applied voltage for each region of a reflection surface which reflect an optical signal.

The reflection characteristics of the LCOS are determined based on the refractive index distributions in the reflection surface and affect the width of the band in which an optical signal passes. Hence, the LCOS functions as a wavelength filter capable of controlling the passband of an optical signal in pixel (slot) unit.

The WSS control section 105 sets the bandwidth BWi of the wavelength band of each optical signal as the passband of the wavelength filter. In this way, the WSS control section 105 allocates the wavelength band to each of the optical signals of the respective channels CH #1 to CH #m, which are wavelength-multiplexed into the wavelength-multiplexed optical signal Sm. The number of signals allowed to be wavelength-multiplexed into the wavelength-multiplexed optical signal Sm is determined based on the bandwidths BWi.

FIG. 5 is a diagram illustrating an example of an optical spectrum of the wavelength-multiplexed optical signal Sm for each of bandwidths BWx and BWy of optical signals. In FIG. 5, the horizontal axis represents frequency (GHz), that is, wavelength (nm) and the vertical axis represents power (dBm).

Sign Ga represents the optical spectrum in the case of the bandwidth BWx. The number of signals (the number of channels) x (x is a positive integer, x≤m) to be wavelength-multiplexed into the wavelength-multiplexed optical signal Sm is determined based on the ratio between the entire bandwidth BWo and the bandwidth BWx.

Sign Gb represents the optical spectrum in the case of the bandwidth BWy. The number of signals y (y is a positive integer, y≤m) to be wavelength-multiplexed into the wavelength-multiplexed optical signal Sm is determined based on the ratio between the entire bandwidth BWo and the bandwidth BWy. Since the bandwidth BWy is larger than the above-described bandwidth BWx, the number of signals y is smaller than the number of signals x in the case of the bandwidth BWx.

As described above, since the larger the bandwidth BWx, BWy, the smaller the number of signals x, y, it is possible to increase the power of the wavelength-multiplexed optical signal Sm to be outputted from the post-amplifier 102. Since the bandwidth BWx, BWy is set larger as the baud rate of the optical signal is higher, it is possible to maintain a sufficient transmission capacity with a high baud rate, and also to improve the OSNR tolerance by increasing the power of the wavelength-multiplexed optical signal Sm in accordance with the bandwidth BWx, BWy. Note that in this specification, the OSNR is described with the resolution set to 0.1 (mm).

FIG. 6 is a diagram illustrating an example of an optical spectrum the power of which changes in accordance with the bandwidth BWi. The bandwidth BWi may be, for example, 50 (GHz), 62.5 (GHz), 75 (GHz), 100 (GHz), or 150 (GHz). These bandwidths BWi correspond to 33 (Gbaud), 44 (Gbaud), 66 (Gbaud), 88 (Gbaud), and 132 (Gbaud), respectively.

The power of each optical signal wavelength-multiplexed into the wavelength-multiplexed optical signal Sm is controlled such that the larger the bandwidth BWi, the higher the power. As an example, the standard power corresponding to a standard bandwidth of 12.5 (GHz) is specified to be −6 (dBm), and the power of the optical signal is calculated from the standard power and the ratio between the standard bandwidth and the bandwidth BWi (hereinafter, referred to as "band ratio"). For example, in the case where the bandwidth BWi is 150 (GHz), the power of the optical signal is controlled to be +4.8 (dBm) while in the case where the bandwidth BWi is 50 (GHz), the power of the optical signal is controlled to be 0 (dBm).

Hence, in the case where the baud rate is set to be high so as to increase the transmission capacity for optical signals, the bandwidth BWi is also set to be large in accordance with the baud rate, so that the power is increased and the OSNR tolerance is improved.

By specifying the standard bandwidth and the standard power, it is also possible to limit the maximum power of the wavelength-multiplexed optical signal Sm to be inputted to the post-amplifier 102 and the maximum power of the wavelength-multiplexed optical signal Sm to be outputted from the post-amplifier 102 in accordance with the performance of the post-amplifier 102. In this example, the standard bandwidth and the standard power are specified on the assumption that the amount of power amplification of the post-amplifier 102 is 19.8 (dBm) and the amplification band (gain level band) is 4800 (GHz). The same applies to the pre-amplifier 101 and the inline-amplifier 3.

Referring to FIG. 4A again, the WSS control section 105 is an example of a first control section and controls the power of the wavelength-multiplexed optical signal Sm in accordance with the wavelength bands allocated to the optical signals of the respective channels CH #1 to CH #m. For example, the WSS control section 105 acquires the power Pt corresponding to the bandwidth BWi for each of the channels CH #1 to CH #m set from the network management device 8 from a power database (DB) 106a stored in the memory 106. Although the memory 106 is an example of a first storage section, the first storage section is not limited to the memory 106 but may be, for example, another storage such as a hard disk drive.

In the power DB 106a, the bandwidth BWi and the power Pt are registered in association with each other. The power Pt is a target value for the power of the optical signal outputted from the VOA 23. The power DB 106a is generated for each ROADM 1 by the network management device 8, for example.

The WSS control section 105 acquires the bandwidth BWi for each of the channels CH #1 to CH #m from the network management device 8 and sets the bandwidth BWi in the wavelength multiplexer 24. The WSS control section 105 acquires the power Pt corresponding to the bandwidth BWi from the power DB 106a. For example, in the case where the bandwidth BWi is 100 (GHz), −17.0 (dBm) is acquired as the power Pt.

The WSS control section 105 may calculate the powers Pt by the following method without using the power DB 106a.

Figure 4B:
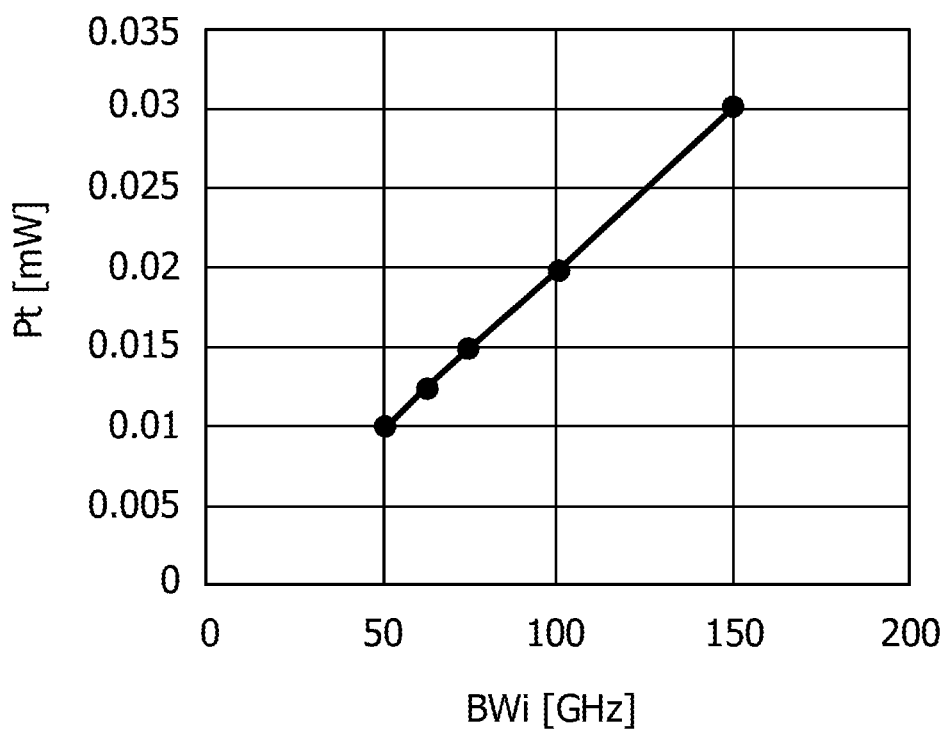
FIG. 4B is a graph illustrating an example of a relation between bandwidth and power.

FIG. 4B is a diagram illustrating an example of a relation between the bandwidth BWi and the power Pt. The relation between the bandwidth BWi and the power Pt is based on the content of the power DB 106a. The unit of the power Pt is expressed by mW.

The power Pt of the optical signal increases in proportion to the corresponding bandwidth BWi. For this reason, the WSS control section 105 is capable of calculating the power Pt from the bandwidth BWi based on the proportional relation.

In this way, the WSS control section 105 controls amount of attenuation of each VOA 23 such that the power Pt of the optical signal outputted from each VOA 23 increases in proportion to the bandwidth BWi allocated to the optical signal. For this reason, the WSS control section 105 is capable of controlling the power Pt of the optical signal without using the power DB 106a.

The WSS control section 105 controls the amount of attenuation of each VOA 23 such that the power of the optical signal provided from the OCM 104 approximates the power Pt acquired from the power DB 106a. In this way, the power of the wavelength-multiplexed optical signal Sm to be inputted to the post-amplifier 102 is controlled in accordance with the bandwidth BWi for each of the channels CH #1 to CH #m. Note that the bandwidths BWi for the respective channels CH #1 to CH #m may be different or may be the same.

In this way, the WSS control section 105 controls the amount of attenuation of the VOA 23 in accordance with the bandwidth BWi allocated to the optical signal of each of the channels CH #1 to CH #m. Hence, the WSS control section 105 is capable of individually controlling the power of the optical signal for each of the channels CH #1 to CH #m.

Since the WSS control section 105 acquires the powers Pt based on the correspondence relation between the bandwidth BWi and the power Pt stored in the memory 106, it is possible to omit the process of calculating the powers Pt. Nonetheless, the WSS control section 105 is not limited to this, and may calculate the powers Pt as described below.

$$Pt = Pr + 10 \log_{10}(BWi/BWr) \qquad (1)$$

The WSS control section 105 may calculate the powers Pt in accordance with the above formula (1). Here, the variable Pr is, for example, −26 (dBm) obtained by subtracting 20 (dB), which is the amplification gain of the post-amplifier 102, from −6 (dBm) of the standard power, and the variable BWr is, for example, 12.5 (GHz) of the standard bandwidth. The variables Pr and BWr are stored in the memory 106.

The post-amplifier 102 may control the gain such that the power of the wavelength-multiplexed optical signal Sm to be outputted to the transmission path 9 becomes the target value.

Figure 7A:
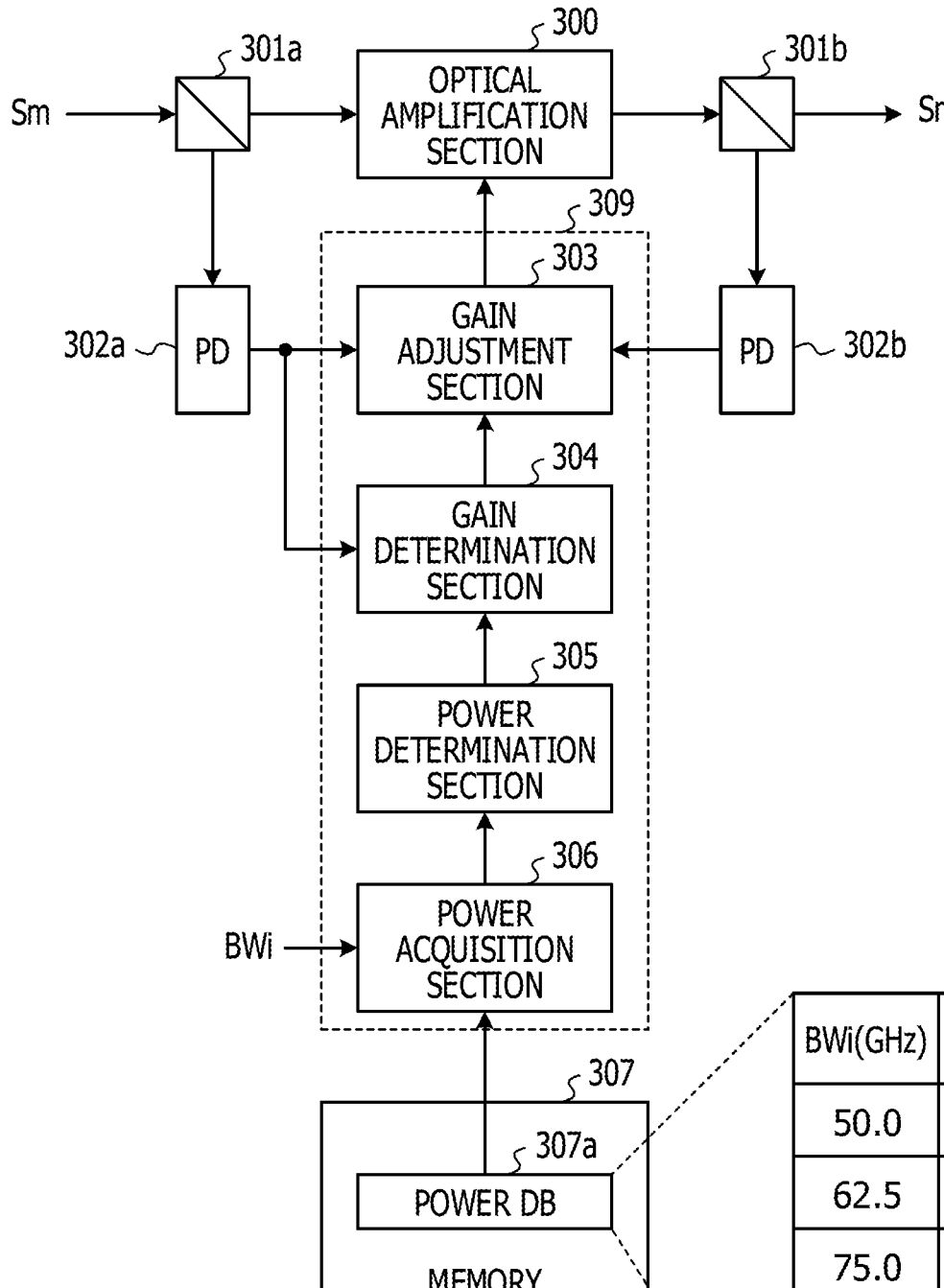
FIG. 7A is a configuration diagram illustrating an example of a post-amplifier.

FIG. 7A is a configuration diagram illustrating an example of the post-amplifier 102. The post-amplifier 102 includes an optical amplification section 300, splitters 301a and 301b, photodetectors (PDs) 302a and 302b, an amplifier control section 309, and a memory 307.

The splitter 301a splits the wavelength-multiplexed optical signal Sm and guides the split parts to the PD 302a and the optical amplification section 300. The optical amplification section 300 is an example of an amplification section, and includes a light source for excitation light, an erbium-doped fiber, and the like and amplifies the wavelength-multiplexed optical signal Sm with the excitation light. The amplified wavelength-multiplexed optical signal Sm is inputted to the splitter 301b.

The PD 302a electrically detects the power of the wavelength-multiplexed optical signal Sm to be inputted to the optical amplification section 300 and notifies a gain adjustment section 303 and a gain determination section 304 of the detected power. The PD 302b electrically detects the power of the wavelength-multiplexed optical signal Sm outputted from the optical amplification section 300 and notifies the gain adjustment section 303 of the detected power.

The amplifier control section 309 includes the gain adjustment section 303, the gain determination section 304, a power determination section 305, and a power acquisition section 306. The amplifier control section 309 is configured of a processor such as a CPU or hardware such as a field-programmable gate array (FPGA) or an application-specific integrated circuit (ASIC).

The amplifier control section 309 is an example of a second control section and controls the gain of the optical amplification section 300 in accordance with the bandwidth BWi allocated to the optical signal of each of the channels CH #1 to CH #m. Since the power of the wavelength-multiplexed optical signal Sm is controlled also in the post-amplifier 102 in addition to the control of the power of each optical signal in the VOA 23 at the input side of the post-amplifier 102, it is possible to improve the precision of the control.

The power acquisition section 306 acquires the power Pout of the optical signal from the bandwidth BWi acquired from the network management device 8 based on a power DB 307a stored in the memory 307. In the power DB 307a, the bandwidth BWi and the power Pout are registered in association with each other. The power DB 307a is generated for each ROADM 1 by the network management device 8, for example. Note that the memory 307 is an example of a second storage section.

The power acquisition section 306 acquires, from the power DB 307a, the power Pout corresponding to the bandwidth BWi for each of the channels CH #1 to CH #m and outputs the power Pout to the power determination section 305. The power Pout is a target value for the power of the optical signal outputted from the post-amplifier 102. The power determination section 305 determines the power of the wavelength-multiplexed optical signal Sm from the powers Pout of the respective channels CH #1 to CH #m.

The power determination section 305 determines the total sum of the powers Pout of the respective channels CH #1 to CH #m as the power of the wavelength-multiplexed optical signal Sm, for example. For this reason, in the case where the bandwidths BWi of the respective channels CH #1 to CH #m are the same, for example, the power of the wavelength-multiplexed optical signal Sm takes a value obtained by multiplying the power Pout of each optical signal by the number of channels (the number of wavelengths). The power determination section 305 notifies the gain determination section 304 of the power of the wavelength-multiplexed optical signal Sm.

The gain determination section 304 determines the target value of the gain of the optical amplification section 300, for example, based on the ratio of powers provided by the PD 302a and the power determination section 305, and the like, and notifies the gain adjustment section 303 of the target value. The gain adjustment section 303, for example, adjusts the gain of the optical amplification section 300 based on the powers provided respectively by the PDs 302a and 302b as well as the target value for the gain provided by the gain determination section 304. In this way, the power of the wavelength-multiplexed optical signal Sm to be outputted from the optical amplification section 300 is controlled to a value corresponding to the bandwidths BWi.

In this way, the amplifier control section 309 acquires, from the power DB 307a, the powers Pout corresponding to the wavelength bands allocated to the optical signals of the respective channels CH #1 to CH #m and controls the gain of the optical amplification section 300 such that the power of the wavelength-multiplexed optical signal Sm approximates the total sum of the powers Pout. Since the amplifier control section 309 acquires the powers Pout based on the correspondence relation between the bandwidth BWi and the power Pout stored in the memory 307, it is possible to omit the process of calculating the powers Pout. Nonetheless, the amplifier control section 309 is not limited to this, and may calculate the powers Pout as described below.

$$Pout = Pr' + 10 \log_{10}(BWi/BWr) \qquad (2)$$

The amplifier control section 309 may calculate the powers Pout in accordance with the above formula (2). Here, the variable Pr' is, for example, −6 (dBm) of the standard power and the variable BWr is, for example, 12.5 (GHz) of the standard bandwidth. The variables Pr' and BWr are stored in the memory 307.

The amplifier control section 309 is not limited to the above-described calculation method but may calculate the power Pout from the bandwidth BWi as described below.

Figure 7B:
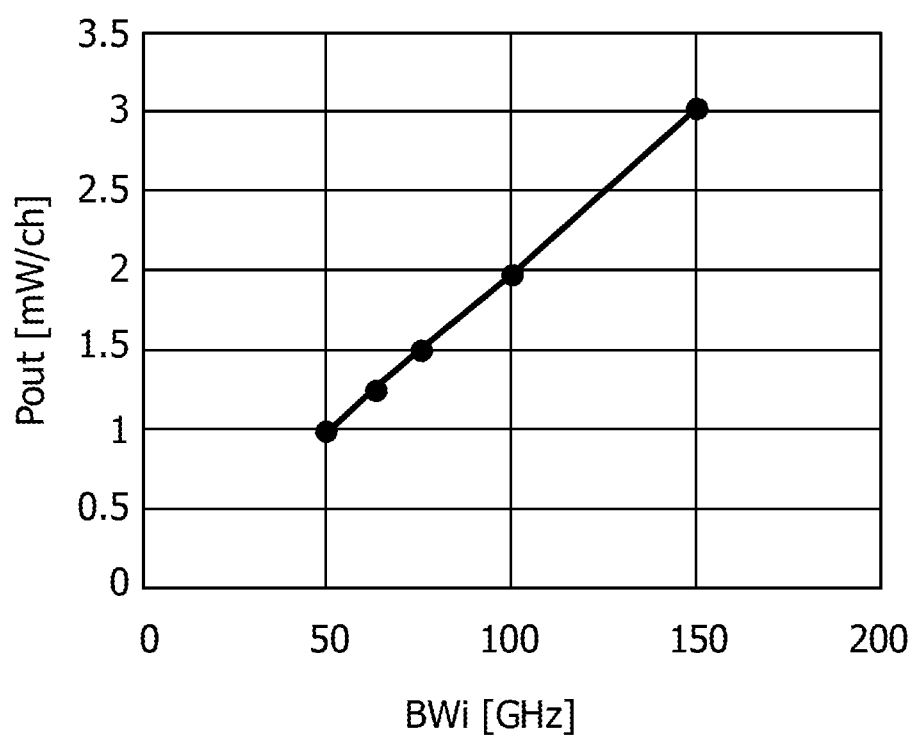
FIG. 7B is a diagram illustrating an example of a relation between bandwidth and power.

FIG. 7B is a diagram illustrating an example of a relation between the bandwidth BWi and the power Pout. The relation between the bandwidth BWi and the power Pout is based on the content of the power DB 307a. The unit of the power Pout for each channel is expressed by mW/ch.

The power Pout of the optical signal increases in proportion to the corresponding bandwidth BWi. For this reason, the amplifier control section 309 is capable of calculating the power Pout from the bandwidth BWi based on the proportional relation.

In this way, the amplifier control section 309 controls the gain of the optical amplification section 300 such that the power of the optical signal contained in the wavelength-multiplexed optical signal Sm to be outputted from the optical amplification section 300 increases in proportion to the bandwidth BWi allocated to the optical signal. For this reason, the amplifier control section 309 is capable of controlling the power Pout of the optical signal without using the power DB 307a.

As described above, since the post-amplifier 102 controls the power of the wavelength-multiplexed optical signal Sm in accordance with the bandwidth BWi of each of the channels CH #1 to CH #m, control with high precision becomes possible. Such control of the gain may be implemented with the same configuration as described above also in the pre-amplifier 101 and the inline-amplifier 3.

Figure 8:
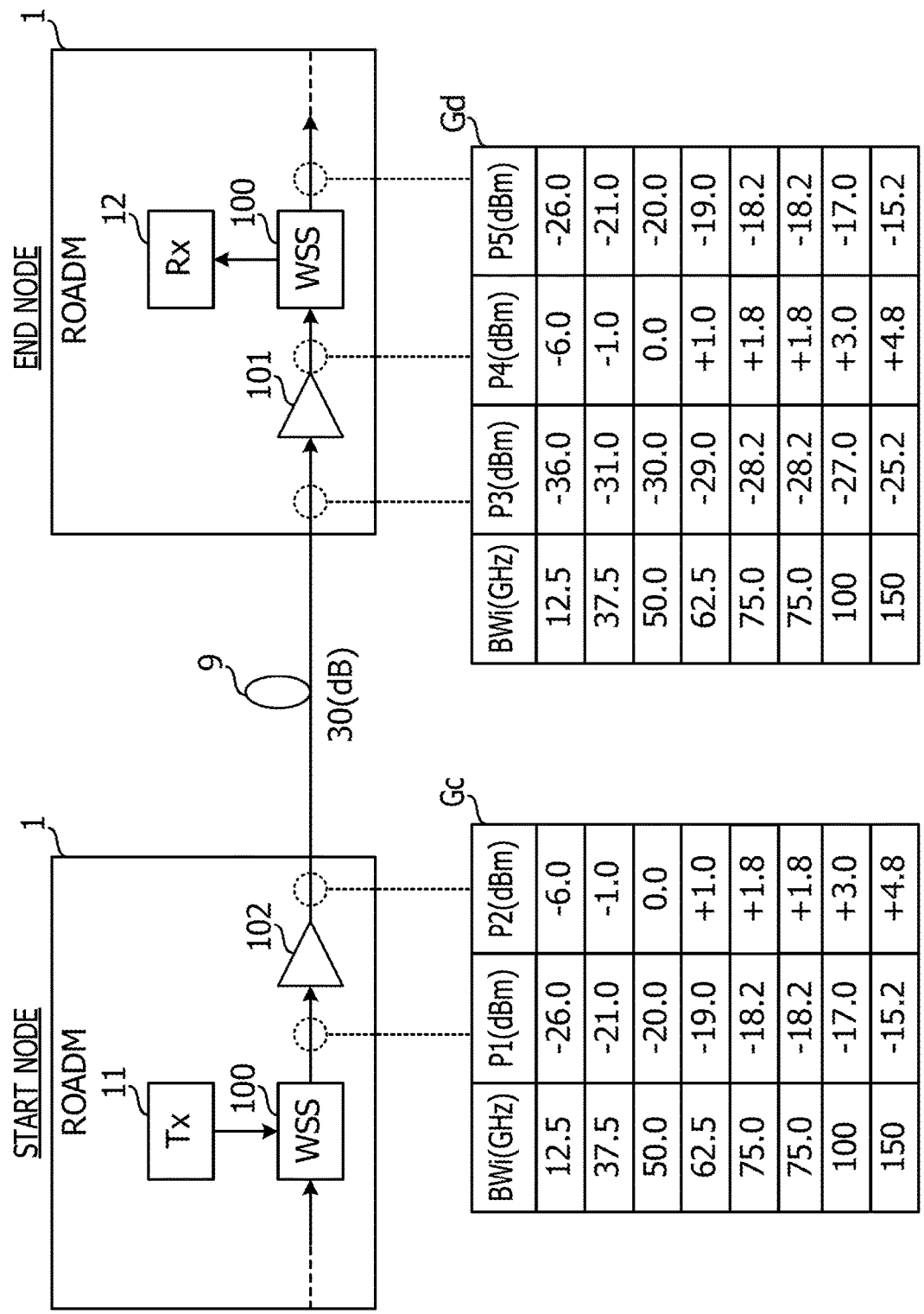
FIG. 8 is a diagram illustrating an example of power control on a route of an optical signal between a start node and an end node.

FIG. 8 is a diagram illustrating an example of power control on a route of an optical signal between a start node and an end node. FIG. 8 illustrates only the configuration on the route of the optical signal in each of the ROADMs 1 at the start node and the end node. It is assumed that in this example, the power loss of an optical signal in the transmission path 9 connecting the start node and the end node is 30 (dB).

Sign Gc indicates the target value P1 for the power of the optical signal between the WSS section 100 and the post-amplifier 102 and the target value P2 for the power of the optical signal between the post-amplifier 102 and the transmission path 9 for each bandwidth BWi at the start node. The target value P2 for the power at the output side of the post-amplifier 102 takes a value obtained by increasing the target value P1 for the power at the input side of the post-amplifier 102 by 20 (dB).

The WSS control section 105 controls the amount of attenuation of the VOA 23 in each of the channels CH #1 to CH #m such that the power of the optical signal approximates the target value P1. The amplifier control section 309 controls the gain of the optical amplification section 300 such that the power of the wavelength-multiplexed optical signal Sm approximates the total sum of the target values P2 of the entire channels CH #1 to CH #m.

Sign Gd indicates the target value P3 for the power of the optical signal between the transmission path 9 and the pre-amplifier 101, the target value P4 for the power of the optical signal between the pre-amplifier 101 and the WSS section 100, and the target value P5 for the power of the optical signal to be outputted from the WSS section 100 to the latter stage for each bandwidth BWi at the end node. The target value P3 for the power at the input side of the pre-amplifier 101 take a value obtained by reducing the target value P2 for the power at the output side of the post-amplifier 102 at the start node by 30 (dBm) of the power loss in the transmission path 9.

The pre-amplifier 101 amplifies the optical signal so as to compensate for the power loss in the transmission path 9. For this reason, the target value P4 for the power at the output side of the pre-amplifier 101 takes a value obtained by increasing the target value P3 for the power at the input side of the pre-amplifier 101 by 30 (dB). In the pre-amplifier 101, the amplifier control section 309 controls the gain of the optical amplification section 300 such that the power of the wavelength-multiplexed optical signal Sm approximates the total sum of the target values P4 of the entire channels CH #1 to CH #m. The target value P5 for the power at the output side of the WSS section 100 is the same as the target value P1 for the power at the output side of the WSS section 100 at the start node. although in this example, the output powers of the post-amplifier 102 and the pre-amplifier 101 are the same as an example, these output powers may be different.

As described above, each ROADM 1 performs power control in the WSS section 100, the post-amplifier 102, and the pre-amplifier 101 on the route of the optical signal. In the case where the inline-amplifier 3 is present on the route of the optical signal, the inline-amplifier 3 may also perform power control on the optical signal.

In the case where the precision of the power control in the WSS section 100 is sufficiently high, the gain of the post-amplifier 102 is maintained at a certain level, and the pre-amplifier 101 and the inline-amplifier 3 may be controlled to have gains according to the transmission loss. Although the power control is performed based on the bandwidth BWi in this example, the power control may be performed based on the bandwidth BWi and the baud rate.

Next, the network management device 8 is described.

Figure 9:
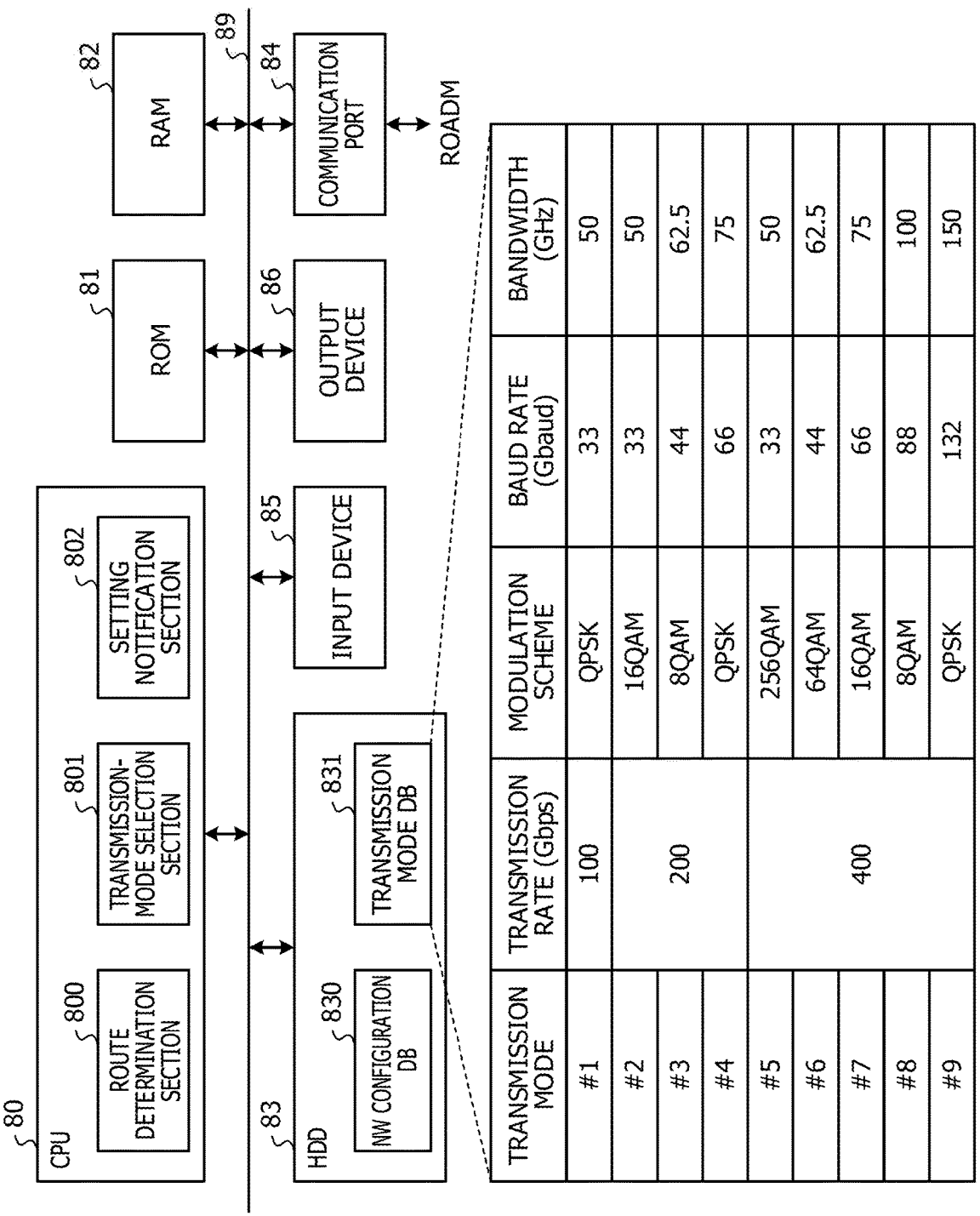
FIG. 9 is a configuration diagram illustrating an example of a network management device.

FIG. 9 is a configuration diagram illustrating an example of the network management device 8. The network management device 8 includes a CPU 80, a read only memory (ROM) 81, a random access memory (RAM) 82, a hard disk drive (HDD) 83, a communication port 84, an input device 85, and output device 86. The CPU 80 is connected to the ROM 81, the RAM 82, the HDD 83, the communication port 84, the input device 85, and the output device 86 via a bus 89 such that signals may be inputted and outputted into and from each other.

The ROM 81 stores programs for driving the CPU 80. The RAM 82 functions as a working memory for the CPU 80. The communication port 84 is, for example, a wireless local area network (LAN) card or a network interface card (NIC) and communicates with each ROADM 1 via a LAN or the like.

The input device 85 is a device used to input information into the CPU 80. The input device 85 may be, for example, a keyboard, a mouse, a touch panel, or the like. The input device 85 outputs the inputted information to the CPU 80 via the bus 89.

The output device 86 is a device used to output information from the CPU 80. The output device 86 may be, for example, a display, a touch panel, a printer, or the like. The output device 86 acquires and outputs information from the CPU 80 via the bus 89.

Once reading the programs from the ROM 81, the CPU 80 forms a route determination section 800, a transmission-mode selection section 801, and a setting notification section 802, as functions. The HDD 83 also stores a network configuration database (NW configuration DB) 830 and a transmission mode database (transmission mode DB) 831. The NW configuration DB 830 and the transmission mode DB 831 are written in the HDD 83 from the input device 85 via the CPU 80, for example.

In the NW configuration DB 830, information indicating the connection configuration, the vacant channel, and the like between nodes each equipped with the ROADM 1 has been registered. The route determination section 800 determines the route of the optical signal based on the NW configuration DB 830 in response to an optical path setting request inputted by the user from the input device 85. In the optical path setting request, designated are the start node and the end node of the route for the optical signal, and the transmission rate of the optical signal, that is, the bit rate, and the route determination section 800 generates route information indicating the relay node through which an optical signal passes, the channels CH #1 to CH #m, and the like. The route determination section 800 notifies the transmission-mode selection section 801 of the route information.

In the transmission mode DB 831, the transmission rate (Gbps), the modulation scheme, the baud rate (Gbaud), and the bandwidth (GHz) of each of transmission modes #1 to #9 have been registered. In the transmission mode DB 831, one or more combinations of modulation schemes and baud rates to achieve transmission rates of 100 (Gbps), 200 (Gbps), and 400 (Gbps) have been registered as an example. The bandwidth is the bandwidth BWi to be set in the ROADM 1 and a value according to the baud rate in the transmission mode DB 831 has been registered. Although only one bandwidth is registered in the transmission mode DB 831 of this example, a plurality of candidates for the bandwidth may be registered.

The transmission-mode selection section 801 selects, from the transmission mode DB 831, a transmission mode according to the transmission rate requested by the user. For example, in the case where the transmission rate of 200 (Gbps) is requested, the transmission-mode selection section 801 selects transmission modes #2 to #4.

Moreover, the transmission-mode selection section 801 selects the transmission mode that satisfies a predetermined condition regarding the transmission quality and that has the smallest baud rate in the requested transmission rate of 200 (Gbps) from among transmission modes according to the transmission rate. In the case of the transmission modes #2 to #4, the priority of the transmission mode #2 is highest and the priority of the transmission mode #4 is lowest.

The transmission-mode selection section 801 sets priorities on the transmission modes in ascending order of baud rates and determines the transmission qualities of the respective transmission modes in descending order of the priorities. The transmission-mode selection section 801 notifies the setting notification section 802 of the transmission mode and the route information the transmission-mode selection section 801 has finally selected. The transmission-mode selection section 801 is an example of a selection section.

The setting notification section 802 is an example of a notification section and notifies the ROADMs 1 of information on the various settings via the communication port 84. The setting notification section 802 notifies the ROADMs 1 at the start node and the end node on the route of the optical signal of the modulation scheme, the baud rate, and the bandwidth of the selected transmission mode. The setting notification section 802 also notifies the ROADM 1 at the relay node and the inline-amplifier 3 on the route of the optical signal of the bandwidth of the selected transmission mode. The setting notification section 802 also notifies the ROADMs 1 at the start node and the end node on the route of the optical signal of the switch information based on the route information. In this way, each ROADM 1 executes the setting of the transmission mode according to the optical path requested by the user.

Next, the processing by the network management device 8 is described.

Figure 10:
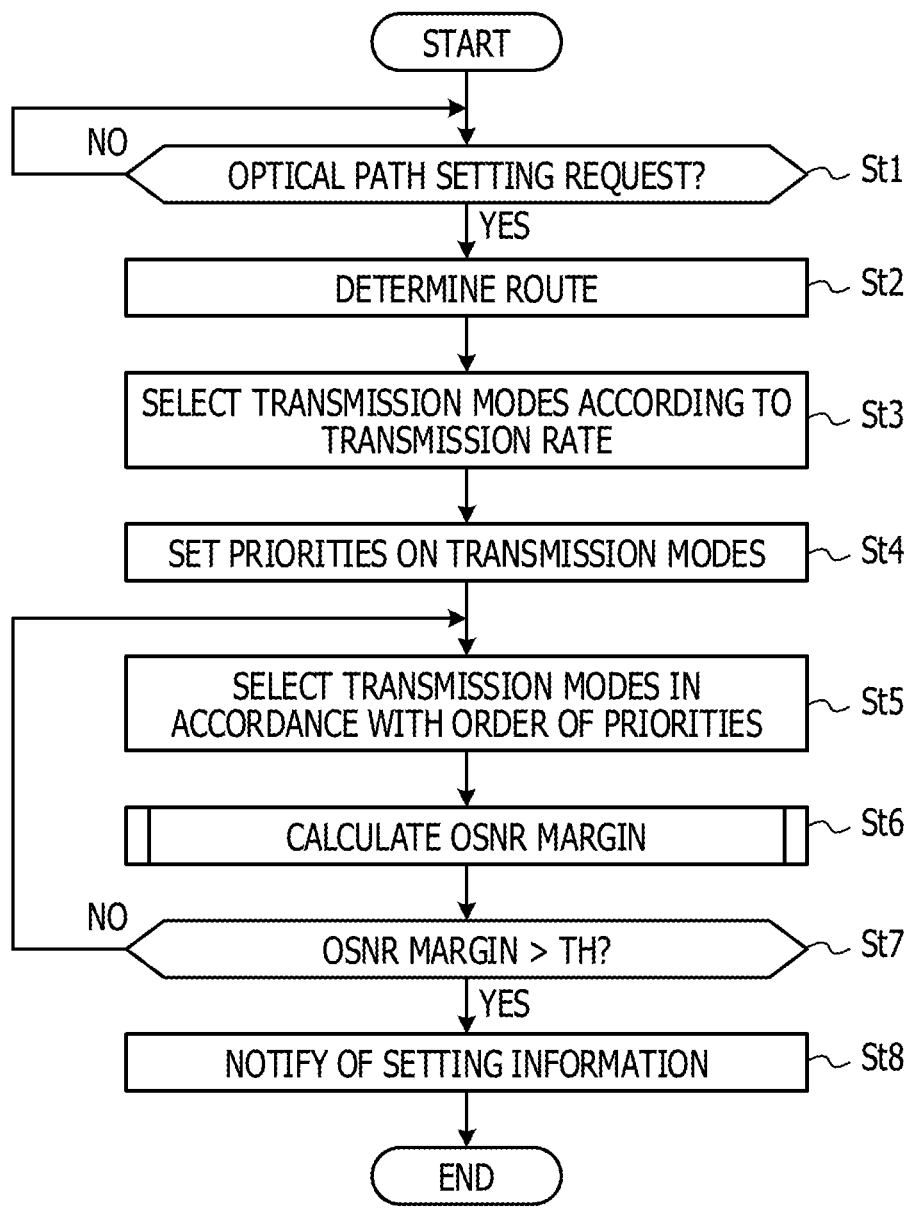
FIG. 10 is a flowchart illustrating an example of processing by the network management device.

FIG. 10 is a flowchart illustrating an example of the processing by the network management device 8. The route determination section 800 determines whether or not there is an optical path setting request on the input device 85 (Step St1). If there is no setting request (No in Step St1), the processing of the Step St1 is executed again.

If there is a setting request (Yes in Step St1), the route determination section 800 determines the route of the optical signal (Step St2). Next, the transmission-mode selection section 801 selects, from the transmission mode DB 831, the transmission mode according to the transmission rate requested by the user (Step St3). Next, the transmission-mode selection section 801 sets priorities on the selected transmission modes in ascending order of baud rates (Step St4).

Next, the transmission-mode selection section 801 selects one of the transmission modes in accordance with the order of priorities (Step St5). Next, the transmission-mode selection section 801 calculates the OSNR margin of the optical signal in accordance with the modulation scheme and the baud rate of the selected transmission mode (Step St6). Note that the process of calculating the OSNR margin is described later.

Next, the transmission-mode selection section 801 determines whether or not the OSNR margin is larger than a threshold TH as an example of the condition on the transmission quality of optical signals (Step St7). If the OSNR margin is smaller than or equal to the threshold TH (No in Step St7), the transmission mode having the next highest priority after the selected transmission mode is selected (Step St5), and the processes of Step St6 and the following Steps are executed again.

If the OSNR margin is larger than the threshold TH (Yes in Step St7), the setting notification section 802 notifies the ROADMs 1 and the like of the switch information, and the modulation scheme, the baud rate, and the bandwidth of the selected transmission mode (Step St8). In this way, the network management device 8 performs the processing.

Figure 11:
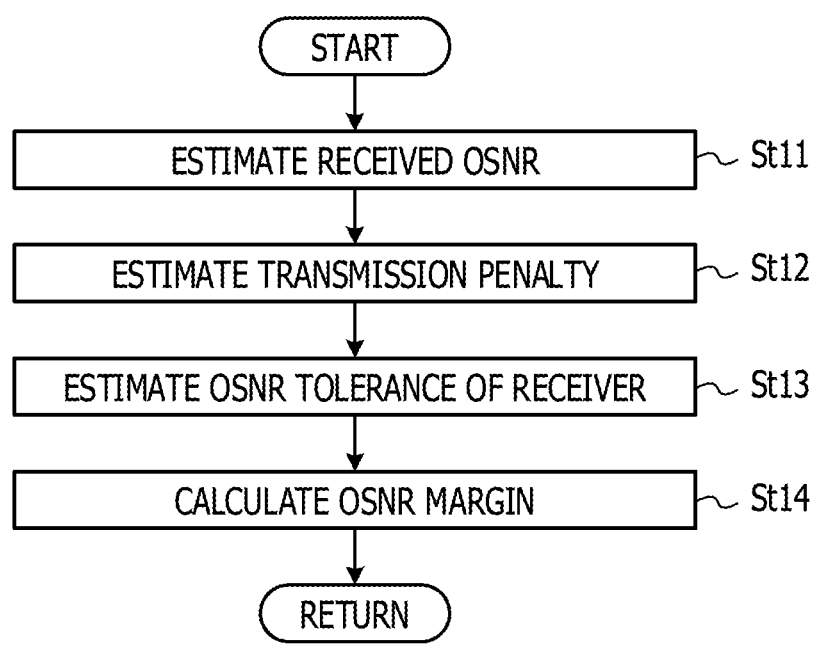
FIG. 11 is a flowchart illustrating an example of the process of calculating an OSNR margin.

FIG. 11 is a flowchart illustrating an example of the process of calculating an OSNR margin. This process is executed in Step St6.

The transmission-mode selection section 801 estimates the received OSNR of the optical signal (Step St11). At this time, the transmission-mode selection section 801 calculates the power Pout of the optical signal outputted from each of the pre-amplifier 101 and the post-amplifier 102 for each bandwidth in accordance with the above-described formula (2) for example, and estimates the received OSNR using the power Pout. In the case where the inline-amplifier 3 is present on the route of the optical signal, the transmission-mode selection section 801 calculates the power Pout of the optical signal outputted from the inline-amplifier 3 like the pre-amplifier 101 and the post-amplifier 102 in accordance with the bandwidth, and then estimates the received OSNR.

Next, the transmission-mode selection section 801 estimates the transmission penalty (the amount of degradation) of the optical signal from the modulation scheme, the baud rate, and the bandwidth of the selected transmission mode (Step St12). Next, the transmission-mode selection section 801 estimates the OSNR tolerance of the receiver 12 from the modulation scheme, the baud rate, and the bandwidth of the selected transmission mode (Step St13).

Next, the transmission-mode selection section 801 calculates the OSNR margin from the received OSNR, the transmission penalty, and the OSNR tolerance (Step St14). The OSNR margin is calculated, for example, by subtracting the transmission penalty and the OSNR tolerance from the received OSNR. In this way, the OSNR margin is calculated.

Figure 12:
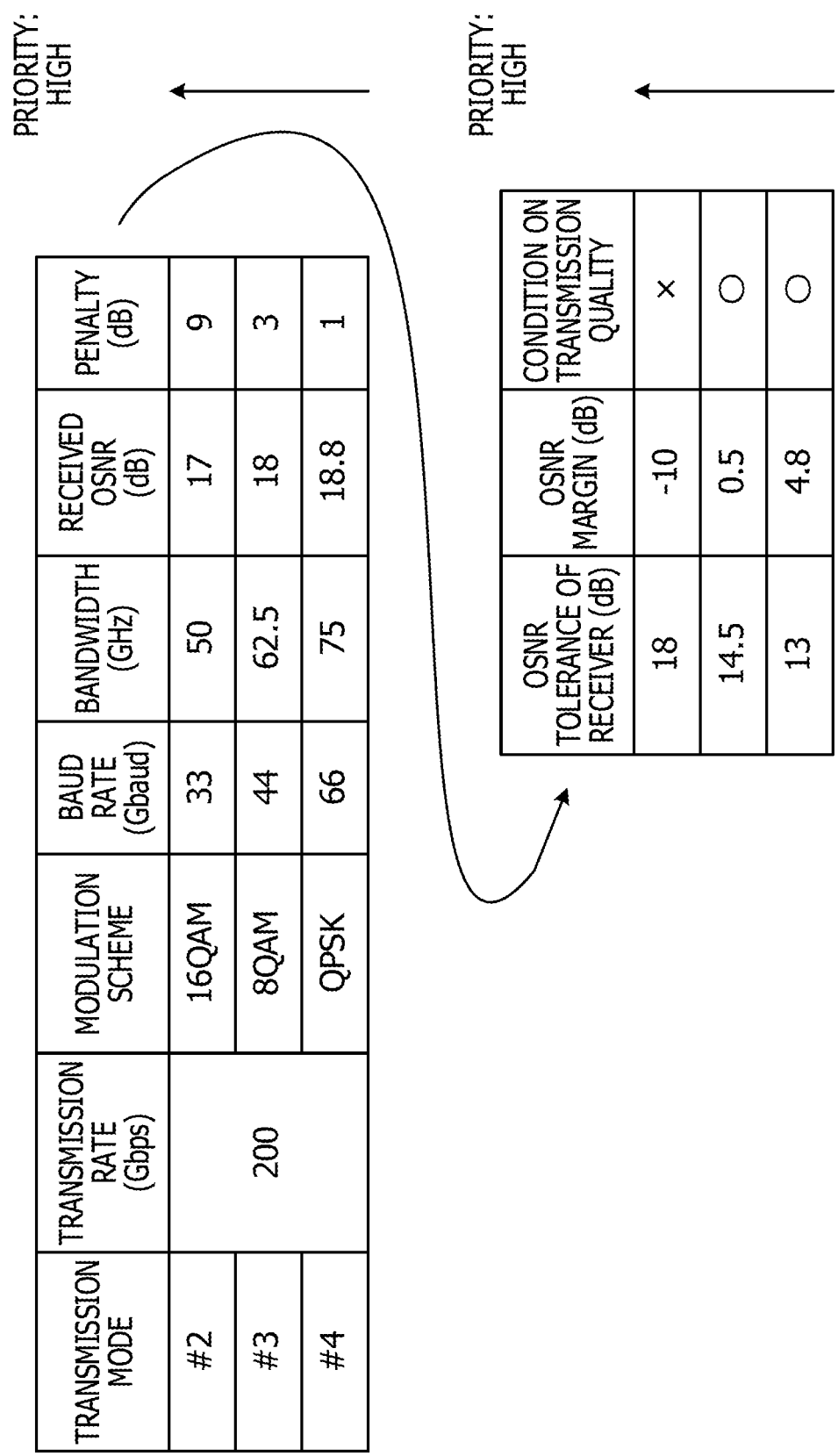
FIG. 12 is a diagram illustrating an example of determination on a condition on a transmission quality based on the OSNR margin.

FIG. 12 is a diagram illustrating an example of determination on a condition on a transmission quality based on the OSNR margin. This example discusses the case where transmission modes #2 to #4 according to the transmission rate of 200 (GHz) are selected from the transmission mode DB 831 in Step St3. The threshold TH in Step St7 is supposed to be 0 (dB) as an example.

The transmission mode #2 having the smallest baud rate has the highest priority. The OSNR margin of the transmission mode #2 is −10 (dB) (=17−9−18), which is smaller than the threshold TH. Hence, the condition on the transmission quality is not satisfied (see "x").

The OSNR margin of the transmission mode #3 is 0.5 (dB) (=18−3−14.5), which is larger than the threshold TH. Hence, the condition on the transmission quality is satisfied (see "○").

The OSNR margin of the transmission mode #4 is 4.8 (dB) (=18.8−1−13), which is larger than the threshold TH. Hence, the condition on the transmission quality is satisfied (see "○").

Although both transmission modes #3 and #4 satisfy the condition on the transmission quality, the transmission mode #3 has a higher priority than that of the transmission mode #4. For this reason, in the ROADM 1, the transmission mode #2 which satisfies the condition on the transmission quality and has the smallest baud rate among the transmission modes #2 to #4 is eventually selected and set in the ROADM 1.

The smaller the baud rate, the smaller the bandwidth in the transmission mode DB 831. For this reason, the smallest bandwidth BWi is set in the ROADM 1. The WSS control section 105 of the ROADM 1 allocates the bandwidth BWi corresponding to the baud rate to the optical signal in the setting by the wavelength multiplexer 24, the number of signals (the number of wavelengths) which the ROADM 1 is capable of transmitting increases (see FIG. 5).

Next, the processing by the ROADM 1 is described.

Figure 13:
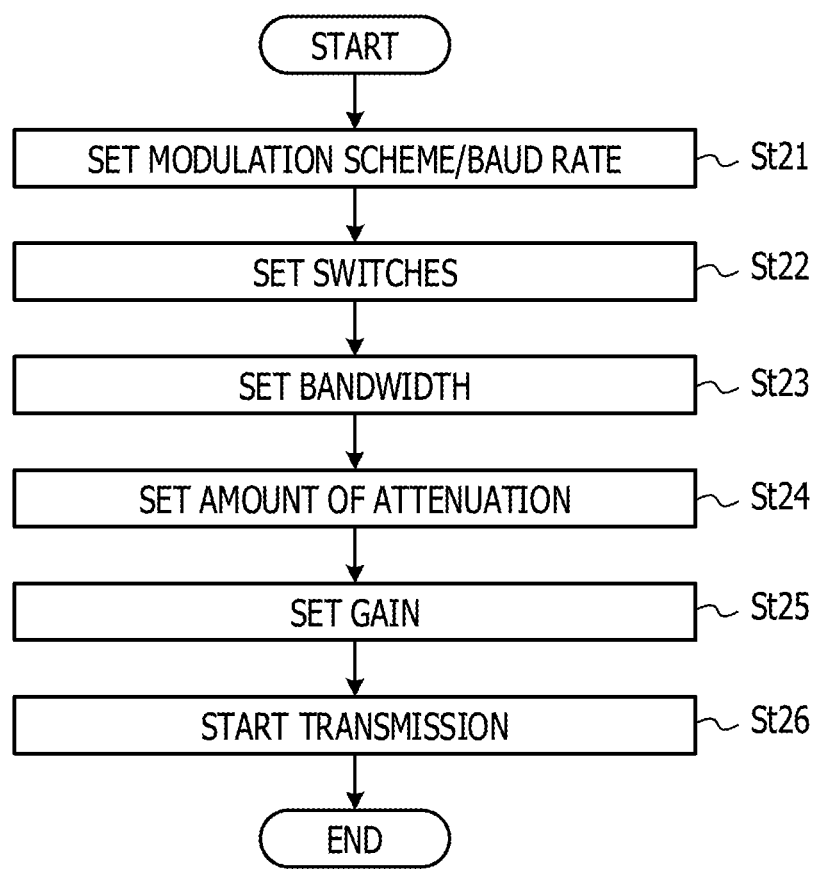
FIG. 13 is a flowchart illustrating an example of processing by a reconfigurable optical add/drop multiplexer (ROADM)

FIG. 13 is a flowchart illustrating an example of the processing by the ROADM 1. This processing is an example of the transmission method by the ROADM 1. In the transmitter 11 and the receiver 12, the setting sections 110 and 120 set the modulation scheme and the baud rate provided by the network management device 8 in the DSPs 112 and 122 (Step St21).

Next, the WSS control section 105 sets the branch switch 21 and the insertion switch 22 based on the switch information provided by the network management device 8 (Step St22). Next, the WSS control section 105 sets the bandwidth BWi for each of the channels CH #1 to CH #m in the wavelength multiplexer 24 (Step St23). In other words, the WSS control section 105 allocates the wavelength band to each of the optical signals which are to be wavelength-multiplexed into the wavelength-multiplexed optical signal Sm.

Next, the WSS control section 105 sets the amount of attenuation according to the bandwidth BWi in the VOA 23 (Step St24). In other words, the WSS control section 105 controls the power of the wavelength-multiplexed optical signal Sm in accordance with the wavelength band allocated to each of the optical signals.

Next, the amplifier control section 309 sets the gain according to the bandwidth BWi in the optical amplification section 300 (Step St25). In other words, the amplifier control section 309 controls the power of the wavelength-multiplexed optical signal Sm in accordance with the wavelength band allocated to each of the optical signals.

Next, the ROADM 1 starts to transmit the optical signal (Step St26). In this way, the WSS section 100 wavelength-multiplexes the optical signals to generate the wavelength-multiplexed optical signal Sm, and the post-amplifier 102 amplifies the wavelength-multiplexed optical signal Sm and outputs the wavelength-multiplexed optical signal Sm to the transmission path. In this way, the ROADM 1 performs the processing.

According to this example, it is possible to extend the transmission distance of optical signals.

Figure 14:
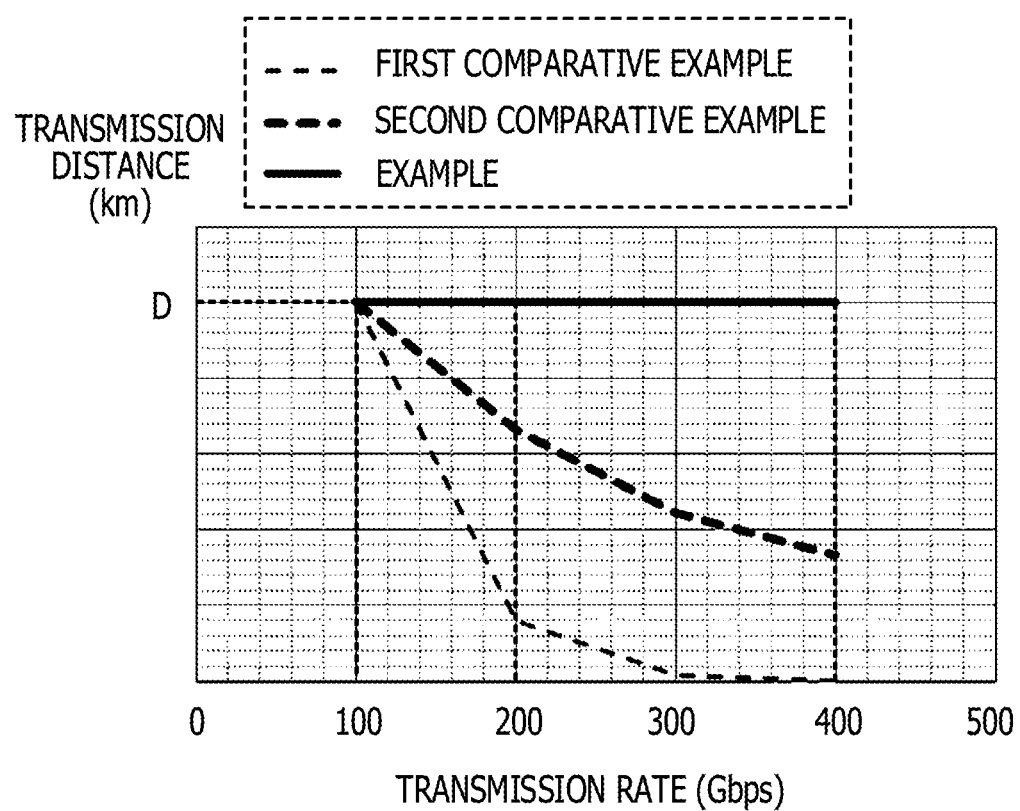
FIG. 14 is a diagram illustrating an example of change in transmission distance relative to a transmission rate of an optical signal.

FIG. 14 is a diagram illustrating an example of change in transmission distance relative to a transmission rate of an optical signal. The solid line indicates change in transmission distance in the case of this example, the thin dotted line indicates change in transmission distance in the case of a first comparative example, and the thick dotted line indicates change in transmission distance in the case of a second comparative example.

In the first comparative example, the transmission rate is changed by switching the modulation scheme while the baud rate is fixed. For this reason, the higher the modulation level of the modulation scheme, the shorter the transmission distance.

In the second comparative example, the transmission rate is changed by changing the baud rate while the modulation scheme is fixed. For example, when the modulation scheme is supposed to be the QPSK, the transmission rate of 100 (Gbps) gives a baud rate of 33 (Gbaud), the transmission rate of 200 (Gbps) gives a baud rate of 66 (Gbaud), and the transmission rate of 400 (Gbps) gives a baud rate of 132 (Gbaud).

However, in the case where the baud rate is increased, the reception performance of the receiver 12 fails to keep up with the increase in baud rate, lowering the OSNR tolerance and hence shortening the transmission distance, though less influential than the case of increasing the modulation level of the modulation scheme like the first comparative example.

In the example, the transmission rate is changed by changing the baud rate while the modulation scheme is fixed like the second comparative example. However, in the example, since the power of the optical signal changes based on the bandwidth BWi (50 (GHz), 75 (GHz), 150 (GHz)) according to the baud rate, the OSNR tolerance is improved and the transmission distance is extended as compared to the second comparative example. In other words, since the bandwidth BWi increases as the baud rate increases, the power of the optical signal increases along with the bandwidth BWi, so that the received OSNR is improved and the transmission distance is extended.

Hence, according to the example, it is possible to transmit optical signals for a fixed transmission distance D regardless of the transmission rate in the case where the modulation scheme is fixed.

FIG. 15 is a diagram illustrating an example of changes in transmission distance and number of wavelengths relative to a baud rate of an optical signal in the case where the transmission rate is fixed to 200 (Gbps). The graph of Sign Ge indicates changes in transmission distance and number of wavelengths in the case of this example and the graph of Sign Gd indicates changes in transmission distance and number of wavelengths in the case of the comparative example. In the comparative example, the control of the power of optical signals according to the bandwidth BWi is not performed unlike this example. Note that the change in number of wavelengths is the same between this example and the comparative example.

As an example, the baud rate changes stepwise to 33 (Gbaud), to 44 (Gbaud), and to 66 (Gbaud), and along with this, the modulation scheme is switched stepwise to 16QAM, to 8QAM, and to QPSK. The number of wavelengths also changes stepwise in accordance with the change in bandwidth BWi (50 (GHz), 62.5 (GHz), and 75 (GHz)) along with the change in baud rate.

As understood from a comparison between the graph of Sign Gd and the graph of Sign Ge, in the case where the baud rate is fixed, the transmission distance of the example is longer than the transmission distance of the comparative example due to the control of the power of the optical signal. For example, to transmit an optical signal for a fixed transmission distance D, the baud rate and the number of wavelengths have to be set to 66 (Gbaud) and 64 waves, respectively (see Pa and Pb) in the case of the comparative example; however, the baud rate and the number of wavelengths may be set to 44 (Gbaud) and 76 waves, respectively (see Pa' and Pb') in the case of the embodiment.

FIG. 16 is a diagram illustrating an example of changes in transmission distance and number of wavelengths relative to the baud rate of an optical signal in the case where the transmission rate is fixed to 400 (Gbps). The graph of Sign Gg indicates changes in transmission distance and number of wavelengths in the case of this example and the graph of Sign Gf indicates changes in transmission distance and number of wavelengths in the case of the comparative example. In the comparative example, the control of the power of optical signals according to the bandwidth BWi is not performed unlike this example. Note that the change in number of wavelengths is the same between this example and the comparative example.

As an example, the baud rate changes stepwise to 44 (Gbaud), to 66 (Gbaud), to 88 (Gbaud), and to 132 (Gbaud), and along with this, the modulation scheme is switched stepwise to 64QAM, to 16QAM, to 8QAM, and to QPSK. The number of wavelengths also changes stepwise in accordance with the change in bandwidth BWi (62.5 (GHz), 75 (GHz), 100 (GHz), and 150 (GHz)) along with the change in baud rate.

As understood from a comparison between the graph of Sign Gf and the graph of Sign Gg, in the case where the baud rate is fixed, the transmission distance of the example is longer than the transmission distance of the comparative example due to the control of the power of the optical signal. For example, to transmit an optical signal for a fixed transmission distance D, the baud rate and the number of wavelengths have to be set to 132 (Gbaud) and 32 waves, respectively (see Pc and Pd) in the case of the comparative example; however, the baud rate and the number of wavelengths may be set to 88 (Gbaud) and 48 waves, respectively (see Pc' and Pd') in the case of the example.

Hence, when the transmission distance D is fixed, the number of wavelengths increases in the case of the example as compared to the comparative example, which also increases the transmission capacity of the wavelength-multiplexed optical signal Sm.

The above-described embodiment is a preferred embodiment of the disclosure. However, the embodiment is not limited to this, various modification may be made without departing from the scope of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device comprising:
   a wavelength multiplexer that wavelength-multiplexes a plurality of optical signals having different wavelengths to generate a wavelength-multiplexed optical signal, the plurality of optical signals including an optical signal;
   an amplifier that outputs the wavelength-multiplexed optical signal to a transmission path; and
   a first processor that allocates wavelength bands to the plurality of optical signals to be wavelength-multiplexed into the wavelength-multiplexed optical signal, wherein
   the first processor controls so that a power that correspond to the optical signal becoming first power when a wavelength band of the optical signal being a first bandwidth, and
   the first processor controls so that the power becoming second power being larger than the first power when the wavelength band being a second bandwidth, the second band width is larger than first bandwidth.

2. The transmission device according to claim 1, wherein the wavelength multiplexer includes a plurality of attenuators that respectively attenuate the plurality of optical signals to be wavelength-multiplexed into the wavelength-multiplexed optical signal, and
   the first processor controls amounts of attenuation of the plurality of attenuators in accordance with the wavelength bands allocated to the plurality of optical signals, respectively.

3. The transmission device according to claim 2, wherein the first processor controls the amounts of attenuation of the plurality of attenuators such that powers of the plurality of optical signals to be outputted from the plurality of attenuators increase in proportion to the wavelength bands allocated to the plurality of optical signals, respectively.

4. The transmission device according to claim 2, further comprising:
   a first memory that stores the wavelength bands and powers of the plurality of optical signals in association with each other,
   wherein the first processor acquires, from the first memory, powers corresponding to the wavelength bands allocated to the plurality of optical signals, and controls the amounts of attenuation of the plurality of attenuators such that the powers of the plurality of optical signals approximate the acquired powers, respectively.

5. The transmission device according to claim 1, wherein the amplifier includes:
   an amplification section that amplifies the wavelength-multiplexed optical signal; and
   a second processor that controls gain of the amplification section in accordance with the wavelength bands allocated to the plurality of optical signals.

6. The transmission device according to claim 5, wherein the second processor controls the gain of the amplification section such that powers of the plurality of optical signals contained in the wavelength-multiplexed optical signal to be outputted from the amplification section increase in proportion to the wavelength bands allocated to the plurality of optical signals.

7. The transmission device according to claim 5, wherein the amplifier includes a second memory that stores the wavelength bands and powers of the plurality of optical signals in association with each other, and
   the second processor acquires, from the second memory, powers corresponding to the wavelength bands allocated to the plurality of optical signals, and controls the gain of the amplification section such that the power of the wavelength-multiplexed optical signal approximates a total sum of the acquired powers.

8. The transmission device according to claim 1, further comprising:
   a transmitter that transmits one of the plurality of optical signals to the wavelength multiplexer; and
   a third processor that sets, in the transmitter, a multi-level modulation scheme and a baud rate of the one of the plurality of optical signals,
   wherein the first processor allocates a wavelength band corresponding to the baud rate to the one of the plurality of optical signals.

9. A transmission system comprising:
   a transmission device that transmits a plurality of optical signals having different wavelengths; and
   a management device that manages the transmission device, wherein
   the management device includes:
   a fourth processor that selects, from a plurality of sets of multi-level modulation schemes and baud rates corresponding to a transmission rate of one of the plurality of optical signals, one set of a multi-level modulation scheme and a baud rate which satisfies a condition on a transmission quality of the optical signal and the baud rate of which is smallest, and that notifies the transmission device of the one set of the multi-level modulation scheme and the baud rate, the plurality of optical signals including an optical signal,
   the transmission device includes:
   a wavelength multiplexer that wavelength-multiplexes the plurality of optical signals to generate a wavelength-multiplexed optical signal;
   a transmitter that transmits the optical signals to the wavelength multiplexer in accordance with the one set of the multi-level modulation scheme and the baud rate;
   an amplifier that outputs the wavelength-multiplexed optical signal to a transmission path; and
   a first processor that allocates wavelength bands corresponding to the baud rate to the plurality of optical signals to be wavelength-multiplexed into the wavelength-multiplexed optical signal, the first processor controls so that a power that correspond to the optical signal becoming first power when a wavelength band of the optical signal being a first bandwidth, the first processor controls so that the power becoming second power being larger than the first power when the wavelength band being a second bandwidth, the second bandwidth is larger than first bandwidth, and the first processor allocates wavelength bands corresponding to the baud rate to the optical signals.

10. The transmission system according to claim 9, wherein the wavelength multiplexer includes a plurality of attenuators that respectively attenuate the plurality of optical signals to be wavelength-multiplexed into the wavelength-multiplexed optical signal, and the first processor controls amounts of attenuation of the plurality of attenuators in accordance with the wavelength bands allocated to the plurality of optical signals, respectively.

11. The transmission system according to claim 10, wherein the first processor controls the amounts of attenuation of the plurality of attenuators such that powers of the plurality of optical signals to be outputted from the plurality of attenuators increase in proportion to the wavelength bands allocated to the plurality of optical signals, respectively.

12. The transmission system according to claim 10, further comprising:

a first memory that stores the wavelength bands and powers of the plurality of optical signals in association with each other, wherein the first processor acquires, from the first memory, powers corresponding to the wavelength bands allocated to the plurality of optical signals, and controls the amounts of attenuation of the plurality of attenuators such that the powers of the plurality of optical signals approximate the acquired powers, respectively.

13. The transmission system according to claim 9, wherein the amplifier includes:

an amplification section that amplifies the wavelength-multiplexed optical signal; and a second processor that controls gain of the amplification section in accordance with the wavelength bands allocated to the plurality of optical signals.

14. The transmission system according to claim 13, wherein the second processor controls the gain of the amplification section such that powers of the plurality of optical signals contained in the wavelength-multiplexed optical signal to be outputted from the amplification section increase in proportion to the wavelength bands allocated to the plurality of optical signals.

15. The transmission system according to claim 13, wherein the amplifier includes a second memory that stores the wavelength bands and powers of the plurality of optical signals in association with each other, and the second processor acquires, from the second memory, powers corresponding to the wavelength bands allocated to the plurality of optical signals, and controls the gain of the amplification section such that the power of the wavelength-multiplexed optical signal approximates a total sum of the acquired powers.

16. The transmission system according to claim 9, further comprising:

a transmitter that transmits one of the plurality of optical signals to the wavelength multiplexer; and a third processor that sets, in the transmitter, a multi-level modulation scheme and a baud rate of the one of the plurality of optical signals, wherein the first processor allocates a wavelength band corresponding to the baud rate to the one of the plurality of optical signals.

17. A transmission method comprising:

wavelength-multiplexing a plurality of optical signals having different wavelengths to generate a wavelength-multiplexed optical signal, the plurality of optical signals including an optical signal;

outputting the wavelength-multiplexed optical signal to a transmission path;

allocating wavelength bands to the plurality of optical signals to be wavelength-multiplexed into the wavelength-multiplexed optical signal, respectively; and controlling so that a power that correspond to the optical signal becoming first power when a wavelength band of the optical signal being a first bandwidth; and controlling so that the power becoming second power being larger than the first power when the wavelength band being a second bandwidth, the second bandwidth is larger than first bandwidth.

18. The transmission method according to claim 17, further comprising:

attenuating the plurality of optical signals to be wavelength-multiplexed into the wavelength-multiplexed optical signal by means of a plurality of attenuators, respectively; and controlling amounts of attenuation of the plurality of attenuators in accordance with the wavelength bands allocated to the plurality of optical signals, respectively.

19. The transmission method according to claim 17, further comprising:

amplifying the wavelength-multiplexed optical signal and outputting the wavelength-multiplexed optical signal to the transmission path by means of an amplification section, and controlling gain of the amplification section in accordance with the wavelength bands allocated to the plurality of optical signals.

20. The transmission method according to claim 17, further comprising:

transmitting one of the plurality of optical signals from a transmitter;

setting, in the transmitter, a multi-level modulation scheme and a baud rate of the one of the plurality of optical signals; and allocating a wavelength band corresponding to the baud rate to the one of the plurality of optical signals.

* * * * *